(12) United States Patent
Loughlin-McHugh et al.

(10) Patent No.: US 9,794,260 B2
(45) Date of Patent: Oct. 17, 2017

(54) LIVENESS DETECTION

(71) Applicant: Yoti Ltd, London (GB)

(72) Inventors: Eleanor Simone Frederika Loughlin-McHugh, London (GB); Roman Edward Szczesniak, London (GB); Georgios Paraskevas, London (GB); Francisco Angel Garcia Rodriguez, Gaudix (ES); Usman Mahmood Khan, Carshalton (GB); Benjamin Robert Tremoulheac, Orleans (FR)

(73) Assignee: Yoti Ltd, London (GB)

( * ) Notice: Subject to any disclaimer, the term of this patent is extended or adjusted under 35 U.S.C. 154(b) by 6 days.

(21) Appl. No.: 14/822,803

(22) Filed: Aug. 10, 2015

(65) Prior Publication Data

US 2017/0048244 A1    Feb. 16, 2017

(51) Int. Cl.
H04L 29/06          (2006.01)
(52) U.S. Cl.
CPC .................................. *H04L 63/10* (2013.01)
(58) Field of Classification Search
CPC ....... H04L 63/10; H04L 63/08; H04L 63/102; H04W 12/06; H04W 12/08
See application file for complete search history.

(56) References Cited

U.S. PATENT DOCUMENTS 5,954,583 A    9/1999  Green
7,027,617 B1   4/2006  Frischholz
8,837,835 B1*  9/2014  Samwel, III ....... G06K 9/00483
                                                382/192
8,856,541 B1   10/2014 Chaudhury et al.
9,075,975 B2   7/2015  Bud
9,147,117 B1   9/2015  Madhu et al.
9,202,105 B1   12/2015 Wang et al.
9,264,419 B1*  2/2016  Johansson ............... H04L 63/08
(Continued)

FOREIGN PATENT DOCUMENTS

CN    101114909 A    1/2008
EP    0970435 A2     1/2000
(Continued)

OTHER PUBLICATIONS

Search Report dated Jul. 19, 2013 in GB Patent Application No. 1303067.1, granted as GB 2501362 A Oct. 23, 2013.
(Continued)

*Primary Examiner* — Yonas Bayou
(74) *Attorney, Agent, or Firm* — Knobbe, Martens, Olson & Bear, LLP

(57) ABSTRACT

In a liveness detection system, a first set of one or more parameters of a first liveness test is selected at random. The first parameter set is transmitted to a user device available to an entity, thereby causing the user device to perform the first liveness test according to the first parameter set. Results of the first liveness test performed at the user device according to the first parameter set are received form the user device. Results of a second liveness test pertaining to the entity are received. The liveness detection system determines whether the entity is a living being using the results of the liveness tests, the results of the first liveness test being so used by comparing them with the first parameter set.

26 Claims, 16 Drawing Sheets

(56) References Cited

U.S. PATENT DOCUMENTS

| | | | |
|---|---|---|---|
| 9,294,475 B2 * | 3/2016 | Hoyos | H04L 63/0861 |
| 9,355,314 B2 * | 5/2016 | Yang | G06K 9/00604 |
| 9,367,677 B1 * | 6/2016 | Adhami | G06F 21/32 |
| 2002/0172419 A1 | 11/2002 | Lin et al. | |
| 2005/0270386 A1 | 12/2005 | Saitoh et al. | |
| 2006/0279726 A1 | 12/2006 | Galambos | |
| 2006/0288234 A1 | 12/2006 | Azar et al. | |
| 2009/0092294 A1 | 4/2009 | Uchida | |
| 2009/0138405 A1 | 5/2009 | Blessing | |
| 2011/0242304 A1 * | 10/2011 | Ichige | G06K 9/00107 348/77 |
| 2012/0075452 A1 | 3/2012 | Ferren | |
| 2013/0219480 A1 * | 8/2013 | Bud | G06F 21/32 726/7 |
| 2013/0336547 A1 * | 12/2013 | Komogortsev | A61B 5/117 382/117 |
| 2014/0016837 A1 | 1/2014 | Nechyba et al. | |
| 2014/0075548 A1 | 3/2014 | Sampathkumaran | |
| 2015/0026797 A1 | 1/2015 | Cao | |
| 2015/0095996 A1 | 4/2015 | Tang | |
| 2015/0264567 A1 | 9/2015 | Sensharma | |
| 2016/0071111 A1 | 3/2016 | Wang et al. | |
| 2016/0140390 A1 * | 5/2016 | Ghosh | G06K 9/00597 348/78 |
| 2016/0241531 A1 * | 8/2016 | Loughlin-McHugh | H04L 63/102 |
| 2016/0241532 A1 * | 8/2016 | Loughlin-McHugh | H04L 63/0838 |
| 2016/0323249 A1 * | 11/2016 | Duncker | H04L 63/102 |
| 2016/0335483 A1 * | 11/2016 | Pfursich | G06K 9/00899 |

FOREIGN PATENT DOCUMENTS

| | | |
|---|---|---|
| EP | 2560123 A1 | 2/2013 |
| EP | 2680191 A2 | 1/2014 |
| GB | 2501362 A | 10/2013 |
| JP | 2006-040151 A | 2/2006 |
| JP | 2006-235718 A | 9/2006 |
| KR | 2009-0018440 A | 2/2009 |
| KR | 2010-0103221 A | 9/2010 |
| WO | WO 98/43216 | 10/1998 |

OTHER PUBLICATIONS

Gragnaniello et al., "An Investigation of Local Descriptors for Biometric Spoofing Detection," *IEEE Transactions on Information Forensics and Security*, vol. 10, No. 4, Apr. 2015, pp. 849-863.

Komulainen, "Software-based Countermeasures to 2D Facial Spoofing Attacks," University of Oulu Graduate School; University of Oulu, Faculty of Information Technology and Electrical Engineering, Department of Computer Science and Engineering; Infotech Oulu *Acta Univ. Oul. C 537*, Aug. 2015, in 92 pages.

Wang et al., "Face Liveness Detection Using 3D Structure Recovered from a Single Camera," 2013 International Conference on Biometrics (ICB), Jun. 4-7, 2013, in 6 pages.

International Search Report mailed Nov. 4, 2016 in corresponding International Application No. PCT/EP2016/069084, filed Aug. 10, 2016.

International Search Report mailed Nov. 11, 2016 in corresponding International Application No. PCT/EP2016/069079, filed Aug. 10, 2016.

\* cited by examiner

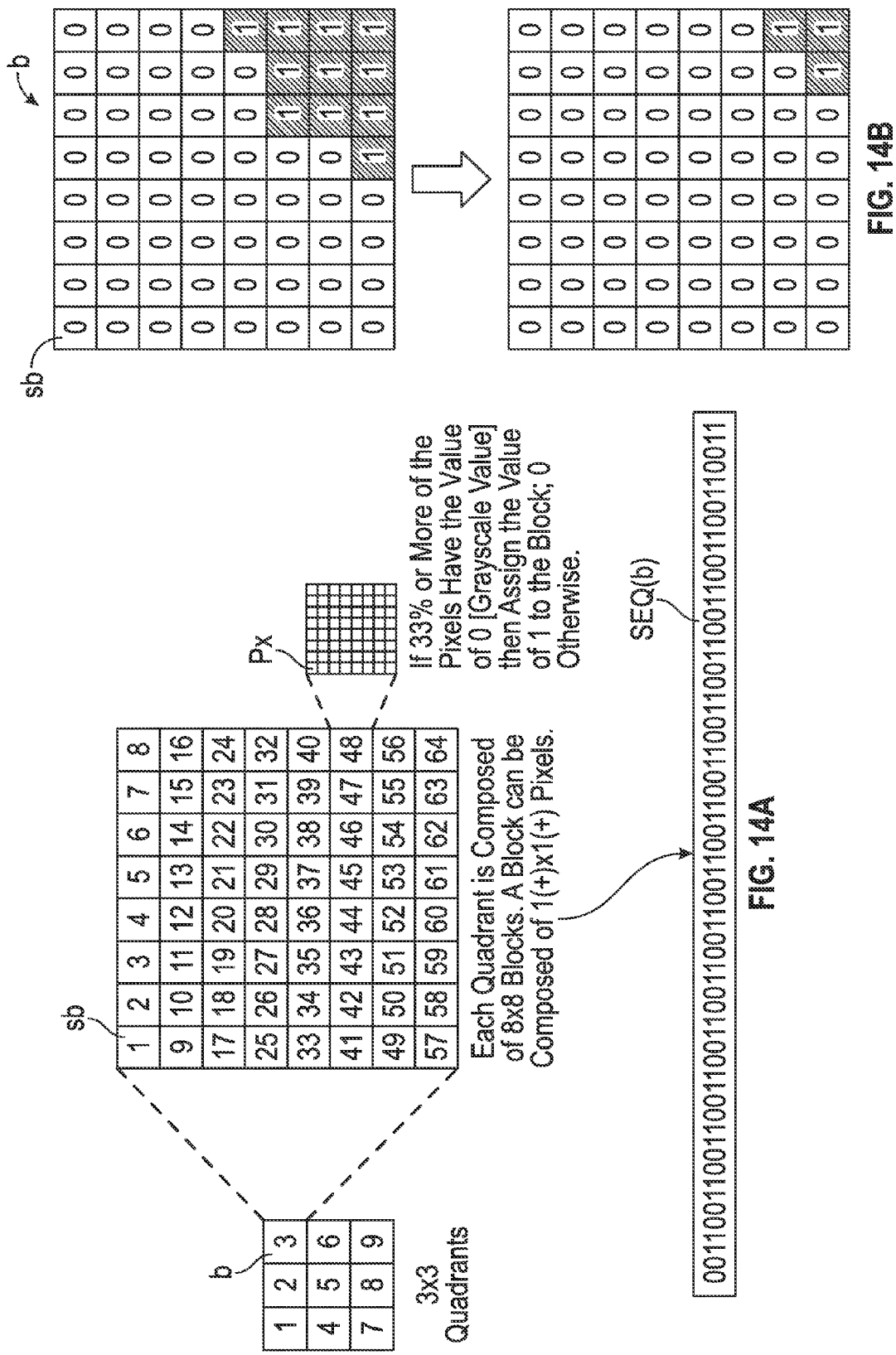

LIVENESS DETECTION

INCORPORATION BY REFERENCE TO ANY PRIORITY APPLICATIONS

The following applications are incorporated herein by reference in their entirety:

| Application No. | Title | Date Filed |
|---|---|---|
| 14/622,740 | AUTHENTICATION OF WEB CONTENT | Feb. 13, 2015 |
| 14/622,527 | DIGITAL IDENTITY | Feb. 13, 2015 |
| 14/622,737 | DIGITAL IDENTITY | Feb. 13, 2015 |
| 14/622,549 | CONFIDENCE VALUES | Feb. 13, 2015 |
| 14/622,709 | DIGITAL IDENTITY SYSTEM | Feb. 13, 2015 |
| 14/822,804 | LIVENESS DETECTION | Aug. 10, 2015 |

BACKGROUND

Field

The described technology is in the field of liveness detection, and has particular applications in the context of network security to prevent spoofing attacks based on entities masquerading as humans.

Description of the Related Art

In the context of network security, a spoofing attack refers to a technique whereby an unauthorized human or software entity masquerades as an authorized entity, thereby gaining an illegitimate advantage.

A particular example is an unauthorized entity masquerading as a particular user so as to gain improper access to the user's personal information held in a notionally secure data store, launch an attack on a notionally secure system by masquerading a system administrator, or gain some other form of access to a notionally secure system which they can then exploit to their benefit.

"Liveness detection" refers to techniques of detecting whether an entity, which may exhibit what are ostensibly human characteristics, is actually a real, living being or is a non-living entity masquerading as such.

One example of liveness detection is the well-known CAPTCHA test; or to give it its full name "Completely Automated Public Turing test to tell Computers and Humans Apart". The test is based on a challenge-response paradigm. In the broadest sense, a system presents an entity with a test that is designed to be trivial for a human but difficult for robot software. A typical implementation is requiring an entity to interpret a word or phrase embodies in an image or audio file. This is an easy task for a human to interpret, but it is a harder task for robot software to interpret the word/image as it is in a non-text format. Variations of this technique include distorting the word or phrase, with the intention of making it even less susceptible to interpretation by software.

Another example of liveness detection is in the context of a system that is notionally secured based on biometrics (e.g. facial, fingerprint, or voice verification). Such a system may require a user wishing to gain access to the system to present one of their biometric identifiers i.e. distinguishing human features (e.g. their face, fingerprint, or voice) to the system using a biometric sensor (e.g. camera; fingerprint sensor; microphone). The presented biometric identifier is compared with biometric data of users who are authorized to access the system, and access is granted to the presenting user only if the biometric identifier matches the biometric data of one of the authorized users.

Such systems can be spoofed by presenting fake biometric samples to the biometric sensor, such as pre-captured or synthesized image/speech data, physical photographs, or even physical, three dimensional models of human features, such as accurate face or finger models. In this context, a robust liveness detection technique needs to be able to reliably distinguish between a real biometric identifier, i.e. captured directly from a living being who wishes to access the system, and a fake biometric identifier, i.e. that has been pre-captured or synthesised.

To date, research into more advanced liveness detection based on biometric data have mostly focussed on machine learning techniques. Machine learning techniques tend to be relatively expensive to implement (in terms of processing resources), and require some form of offline and/or online model training.

SUMMARY

The inventors of the described technology have recognized that physiological responses to randomized outputs (such as randomized visual or audible outputs), as exhibited by visible human features (such as the eyes or mouth), provide an excellent basis for liveness detection, as such reactions are very difficult for non-living entities to replicate accurately.

According to a first aspect of the described technology, a computer-implemented liveness detection method comprises implementing, by a liveness detection system, the following steps. A first set of one or more parameters of a first liveness test is selected at random. The first parameter set is transmitted to a user device available to an entity, thereby causing the user device to perform the first liveness test according to the first parameter set. Results of the first liveness test performed at the user device according to the first parameter set are received form the user device. Results of a second liveness test pertaining to the entity are received. The liveness detection system determines whether the entity is a living being using the results of the liveness tests, the results of the first liveness test being so used by comparing them with the first parameter set.

In embodiments, the method may comprise implementing, by the liveness detection system, steps of: selecting at random a second set of one or more parameters of the second liveness test; and transmitting the second parameter set to the or another user device available to the entity, thereby causing that user device to perform the second liveness test according to the second parameter set, wherein the results of the second liveness test performed at that user device according to the second parameter set are received from that user device and used in the determining step by comparing them with the second parameter set.

The results of at least one of tests that are received at the liveness detection system may have been generated by capturing a moving image of the entity.

For example, the results of the at least one test as received at the liveness detection system comprise information that has been extracted from the moving image. Alternatively, the results of that test that are received at the liveness detection may comprise the moving image, and the method may further comprise processing, by the liveness detection system, the moving image to extract information from the moving image. In either case, the extracted information may be used in the determining step and describe at least one of:

changes in the pupil size of at least one eye of the entity over time;

changes in an iris pattern of at least one eye of the entity over time;

eye movements exhibited by at least one eye of the entity;

lip movements exhibited by lips of the entity.

One of the tests may be performed by emitting at least one light pulse at a randomized timing that is defined by the parameter set of that test; wherein the results of that test convey changes over time in the pupil size and/or in an iris pattern of at least one eye of the entity, and those results are compared with that parameter set to determine whether the changes in the pupil size and/or the iris pattern match the randomized timing.

Alternatively or in addition, one of the tests may be performed by displaying at least one display element at a randomized display location that is defined by the parameter set of that test; wherein the results of that test convey a response of the entity to the at least one display element as displayed in that test, and those results are compared with that parameter set to determine whether the response to the display element matches the at least one randomized display location.

Alternatively or in addition, one of the tests may be performed by displaying a randomly selected display element that is defined by the parameter set of that test; wherein the results of that test convey a response of the entity to the randomly selected display element, and those results are compared with that parameter set to determine whether the response of the entity matches the at least one randomly selected display element.

The second test may be performed by the or another user device monitoring movements of that user device using at least one sensor of that user device.

The method may comprise, by the liveness detection system: transmitting to the entity, from a source address of the liveness detection system, an identifier of at least one destination address (e.g. at least one URI) of the liveness detection system different than the source address; and determining whether the results of at least one of the tests were transmitted to the at least one destination address.

The at least one destination address may be randomly selected by the liveness detection system.

The method may comprise comprising granting the entity access to a remote computer system only if it is determined that it is a living being and the results of the at least one of the test were been transmitted by to the at least one destination address.

The method may comprise, by the liveness detection system: transmitting to the entity, from the source address of the liveness detection system, a first and a second identifier of a first and a second destination address of the liveness detection system respectively, the first and second destination addresses being different from the source address and from each other; determining whether the results of the second test were received at the first destination address; and determining whether the results of the first test were received at the second destination address.

For example the liveness detection system mat comprise: liveness control server logic; first liveness processing server logic for processing the results of the first liveness test, the first liveness processing server logic having a plurality of addresses including the first destination address, and second liveness processing logic for processing the results of the second liveness test, the second liveness processing logic having a plurality of addresses including the first destination address The results of the second test may be received at the first liveness processing server, the results of the first liveness test may be received at the second liveness processing server, and the method may comprise:

the first liveness processing server providing the results of the second liveness test to the liveness control server;

the second liveness processing server providing the results of the first liveness test to the liveness control server; and the liveness control server providing the results of the first test to the first liveness processing server and the results of the second test to the second liveness processing server only if: the results of the second test were received at the first destination address of the first liveness processing server, and the results of the first test were received at the second destination address of the second liveness processing server.

For example, the results of the first and second tests may be received in a first message and a second message respectively, each message comprising a signature expected to have been generated, for each message, from both parameter sets; the liveness control server may compare both signatures with the first and second parameter sets and provide the results of the first test to the first liveness processing server and the results of the second test to the second liveness processing server only if: the second message was received at the first destination address of the first liveness processing server, the first message was received at the second destination address of the second liveness processing server, and both signatures match the parameter sets.

The method may comprise detecting when a timeout condition occurs, the timeout condition caused by an unacceptable delay in receiving the results relative to a timing of the transmitting step, wherein the entity is refused access to a remote computer system in response to the timeout condition occurring.

The method may comprise granting the entity access to a remote computer system only if the entity is determined to be a living being.

The first and second tests may be performed at the same time as one another.

The method may comprise granting the entity access to a remote computer system only if the entity is determined to be a living being.

According to a second aspect of the described technology, a liveness detection system comprises: a set of one or more processing units, the set configured to perform operations of: selecting at random a first set of one or more parameters of a first liveness test; transmitting, to a user device available to an entity, the first parameter set, thereby causing the user device to perform the first liveness test according to the first parameter set; receiving from the user device results of the first liveness test performed at the user device according to the first parameter set; receiving results of a second liveness test pertaining to the entity; and determining whether the entity is a living being using the results of the liveness tests, the results of the first liveness test being so used by comparing them with the first parameter set.

According to a third aspect of the described technology, a computer-implemented liveness detection method is implemented by a liveness detection system. The liveness detection system comprises computer storage storing a shared secret known only to the liveness detection system and one or more authorized user devices. The method comprises implementing by the liveness detection system the following steps. A set of one or more parameters of a liveness test is selected at random which, when combined with the shared secret, define expected outputs that should be provided in the liveness test. The parameter set is transmitted to a user device, thereby causing the user device to perform the liveness test according to the parameter set, whereby the user device can only provide the expected outputs therein if it also has access to its own version of the shared secret. Results of the liveness test performed at the user device according to the first parameter set are received from the user device. The parameter set and the shared secret stored at the liveness detection system are used at the liveness detection system to determine the expected outputs. The results of the liveness test are compared with the determined expected outputs to determine whether the behaviour of an entity that was subject to the liveness test performed at the user device is an expected reaction to the expected outputs, thereby determining from the entity's behaviour both whether the entity is a living being and whether the user device is one of the authorized user device(s).

In embodiments, the shared secret may define a restricted subset of a set of available display locations, wherein the parameter set defines one or more available display locations selected at random from the restricted subset, and wherein the expected outputs are provided by displaying one or more display elements at the one or more randomly selected available display locations on a display of the user device.

The behaviour may be eye movements exhibited by at least one eye of the entity during the displaying of the one or more display elements at the user device and conveyed by the received results, the expected reaction being an expected movement of the eye, whereby it is determined both whether the entity is a living being and whether the user device is one of the authorized user device(s) from the entity's eye movements.

The shared secret may for example define an elliptical curve.

According to a fourth aspect of the described technology, a liveness detection system comprises: computer storage storing a shared secret known only to the liveness detection system and one or more authorized user devices; and a set of one or more processing units, the set configured to perform operations of: selecting at random a set of one or more parameters of a liveness test which, when combined with the shared secret, define expected outputs that should be provided in the liveness test; transmitting the parameter set to a user device, thereby causing the user device to perform the liveness test according to the parameter set, whereby the user device can only provide the expected outputs therein if it also has access to its own version of the shared secret; receiving from the user device results of the liveness test performed at the user device according to the first parameter set; using the parameter set and the shared secret stored at the liveness detection system to determine the expected outputs; and comparing the results of the liveness test with the determined expected outputs to determine whether the behaviour of an entity that was subject to the liveness test performed at the user device is an expected reaction to the expected outputs, thereby determining from the entity's behaviour both whether the entity is a living being and whether the user device is one of the authorized user device(s).

According to a fifth aspect of the described technology, a liveness detection system comprises a controller, a video input, a feature recognition module, and a liveness detection module. The controller is configured to control an output device to provide randomized outputs to an entity over an interval of time. The video input is configured to receive a moving image of the entity captured by a camera over the interval of time. The feature recognition module is configured to process the moving image to detect at least one human feature of the entity. The liveness detection module is configured to compare with the randomized outputs a behaviour exhibited by the detected human feature over the interval of time to determine whether the behaviour is an expected reaction to the randomized outputs, thereby determining whether the entity is a living being.

In embodiments, the human feature that the feature recognition module is configured to detect may be an eye of the entity.

For example, providing the randomized outputs may comprise controlling the output device to emit at least one light pulse having a randomized timing within the moving image, and the expected reaction may be an expected pupillary response to the at least one light pulses. E.g. providing the randomized outputs may comprise controlling the output device to emit at least two randomly light pulse having a randomized separation in time from one another, and the expected reaction may be an expected pupillary response to the at least two light pulses.

The output device may be a camera flash or a display.

The liveness detection system may comprise a velocity measurement module configured to compare frames of the moving image to one another so as to generate a velocity distribution of the eye, the velocity distribution representing the rate of change of the diameter of the pupil at different times, said comparison comprising comparing the velocity distribution with the expected response. For example, said comparison by the liveness detection module may comprise comparing the velocity distribution with a probability distribution, wherein the probability distribution represents the expected pupillary response.

Alternatively or in addition, said comparison by the liveness detection module may comprise: determining a first time, wherein the first time corresponds to a local maximum of the velocity distribution; determining a second time, wherein the second time corresponds to a local minimum of the velocity distribution, the local minimum occurring immediately before or immediately after the local maximum; and determining a difference between the first and second times and comparing the difference to a threshold.

For example, respective differences may be determined between the first time and two second times, one corresponding to the local minimum immediately before the local maximum and one corresponding to the local minimum occurring immediately after the local maximum, and each may be compared to a respective threshold.

The entity may be determined to be a living being only if each of the two differences is below its respective threshold, and the velocity distribution matches the probability distribution.

The output device may be a display.

Providing the randomized outputs may comprise controlling the display to display a display element at a random location of the display, and the expected reaction may be an expected movement of the eye.

The liveness detection system may comprise: a spatial windowing module configured to identify, for each of a plurality of frames of the moving image, an iris area, the iris area corresponding to the iris of the eye in the frame; and an analysis module configured to, for each of a plurality of regions of the iris area, generate a histogram of pixel values within that region for use in tracking movements of the eye, the liveness detection module being configured to perform said comparison by comparing the histograms with the expected movement.

For example, the liveness detection module may be configured to perform said comparison by comparing the histograms with a probability density function representing the expected movement.

Alternatively or in addition, the liveness detection system may comprise: a spatial windowing module configured, for each of a plurality of frames of the moving image, to divide at least a portion of that frame into a plurality of blocks, each block formed one or more respective sub-blocks, each sub-block formed of one or more respective pixels; and an analysis module configured to assign to each block a respective block value based on its one or more respective sub-blocks, the liveness detection module being configured to perform said comparison by comparing the block values with the expected movement.

For example, each sub-block may be formed of a multiple pixels, and/or each block may be formed of multiple sub-blocks.

The analysis module may be configured to assign to each sub-block a binary value by detecting whether or not at least a predetermined proportion of its respective pixels have intensities below an intensity threshold, the block value of each block being assigned by combining the binary values assigned to its respective sub-blocks.

The pixel intensities may be determined by converting the plurality of frames from a colour format into a grayscale format.

Alternatively or in addition, providing the randomized outputs may further comprise accessing user-created data, held a first memory local to the output device, which defines a restricted subset of locations on the display, the random location being selected at random from the restricted subset, wherein the system is also configured to compare the behaviour exhibited by the eye with a version of the user-created data held in a second memory remote from the output device. For example, the user-created data may define a two-dimensional curve, the restricted subset being the set of points on the curve.

The first memory and the output device may be integrated in a user device.

Where the human feature is an eye, the behaviour that is compared with the randomized outputs may be at least one of: changes in the size of the pupil of the eye over time; changes in an iris pattern of the eye over time; and eye movements exhibited the eye.

Alternatively or in addition, providing the randomized outputs may comprise controlling the output device to output at least one randomly selected word; the human feature that the feature recognition module is configured to detect may be a mouth of the entity, and the expected response is the user speaking the word, the movements of the mouth being compared to the random word using a lip reading algorithm.

In any of the above examples, the liveness detection system may comprise an access module configured to grant the entity access to a remote computer system only if they are determined to be a living being.

The liveness detection module may be configured to output at least one of: a confidence value which conveys a probability that the entity is a living being, and a binary classification of the entity as either living or non-living.

According to a sixth aspect of the described technology, a computer-implemented liveness detection method comprises: controlling an output device to provide randomized outputs to an entity over an interval of time; receiving a moving image of the entity captured by a camera over the interval of time; processing the moving image to detect at least one human feature of the entity; and comparing with the randomized outputs a behaviour exhibited by the detected human feature over the interval of time to determine whether the behaviour is an expected reaction to the randomized outputs, thereby determining whether the entity is a living being.

Any of the features of any one of the above aspects or any embodiment thereof may be implemented in embodiments of any of the other aspects. Any of the method disclosed herein may be implemented by logic (e.g. software modules) of a corresponding system. Similarly any of the system functionality disclosed herein may be implemented as steps of a corresponding method.

According to another aspect of the described technology, a computer program product comprises code stored on a computer-readable storage medium and configured when executed to implement any of the method steps or system functionality disclosed herein.

BRIEF DESCRIPTION OF THE DRAWINGS

To aid understanding of the described technology, and to show how the same may be carried into effect, reference is made by way of example to the following figures, in which:

FIGS. 14A and 14B illustrate a novel motion binary pattern technique.

DETAILED DESCRIPTION

The preferred embodiments of the described technology that are described below are implemented based on a comparison of biometric data with probability density functions that have been generated from closed-form equations—no machine learning is required.

Figure 1:
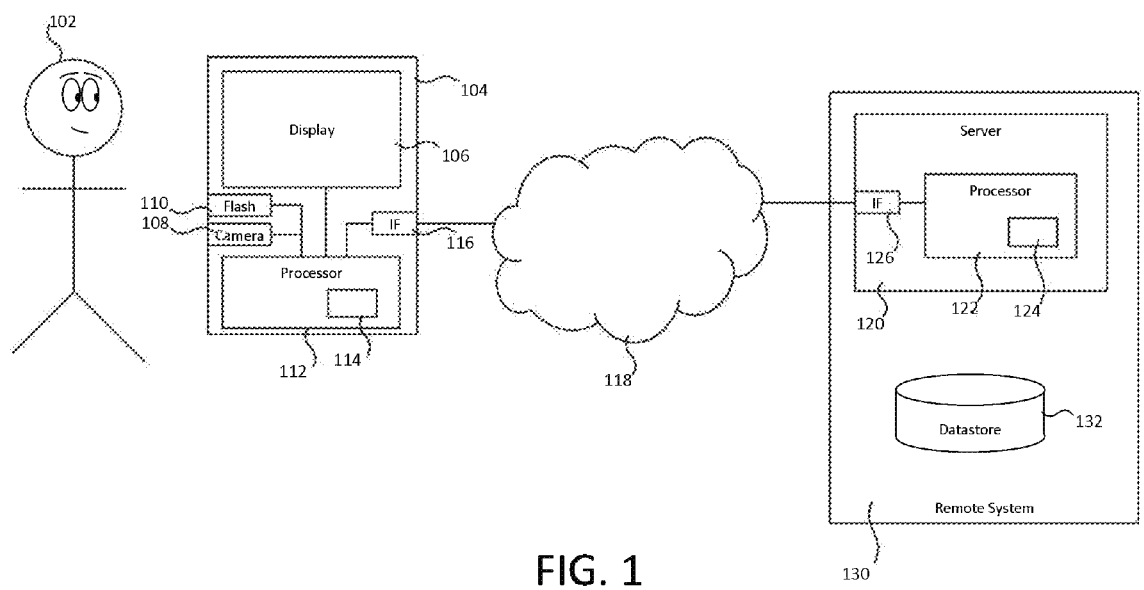
FIG. 1 shows a block diagram of a computer system.

FIG. 1 shows a block diagram of a computer system, which comprises a user device 104 available to a user 2; a computer network 118; and a remote computer system 130 i.e. remote from the user device 104. The user device 104 and remote system 130 are both connected to the network 118, so that data can be transmitted and received between the user device 104 and the remote system 130.

The user device 104 is a computer device which can take a number of forms, such as a mobile device (smartphone, tablet etc.), laptop or desktop computer etc.

The user device 104 comprises a display 106; a camera 108 and camera flash 110; a network interface 116; and a processor 112, formed of one or more processing units (e.g. CPUs), to which each of the aforementioned components of the user device 104 is connected. The processor 112 is configured to execute code, which include a liveness detection application ("app") 114. When executed on the processor 112, the liveness detection app 114 can control the display 106, camera 108 and flash 108, and can transmit and receive data to and from the network 118 via the network interface 116.

The camera 108 is capable of capturing a moving image i.e. video formed of a temporal sequence of frames to be played out in quick succession so as to replicate continuous movement, that is outputted as a video signal from the camera 108. Each frame is formed of a 2-dimensional array of pixels (i.e. image samples). For example, each pixel may comprise a three-dimensional vector defining the chrominance and luminance of that pixel in the frame.

The camera 108 is located so that the user 102 can easily capture a moving image of their face with the camera 108. For example, the camera 108 may be a front-facing camera integrated in a smartphone, tablet or laptop computer screen, or an external webcam mounted on a laptop or desktop display screen.

The flash 110 is controllable to emit relatively high intensity light. Its primary function is to provide a quick burst of illumination to illuminate a scene as the camera 108 captures an image of the scene, though some modern user devices such as smartphones and tablets also provide for other uses of the camera flash 110 e.g. to provide continuous illumination in a torch mode.

The display 106 outputs information to the user 102 in visual form, and may for example be a display screen. In some user devices, the display screen may incorporate a touch screen so that it also functions as an input device for receiving inputs from the user 102.

The remote system 130 comprises at least one processor 122 and network interface 126 via which the processor 122 of the remote system is connected to the network 118. The processor 122 and network interface 126 constitute a server 120. The processor is configured to execute control code 124 ("back-end software"), which cooperates with the liveness detection app 114 on the user device 104 to grant the user device 104 access to the remote system 130, provided certain criteria are met. For example, access to the remote system 130 using the user device 104 may be conditional on the user 102 successfully completing a validation process.

The remote system 130 may for example comprise a secure data store 132, which holds (say) the user's personal data. In order to keep the user's data secure, the back-end software 124 makes retrieval of the user's personal data from the database 132 using the user device 104 conditional on successful validation of the user 102.

Embodiments of the described technology can be implemented as part of the validation process to provide a validation process that includes a liveness detection element. That is, access to the remote system 130 may be conditional on the user 102 passing a liveness detection test to demonstrate that they are indeed a living being. The validation process can also comprise other elements, e.g. based on one or more credentials, such as a username and password, so that the user 102 is required not only to demonstrate that they what they say they are (i.e. a living being) but also that they are who they say they are (e.g. a particular individual)—note hover that it is the former that is the focus of the present disclosure, and the liveness detection techniques can be implemented separately and independently from any identity check or without considering identity at all.

Figure 2A:
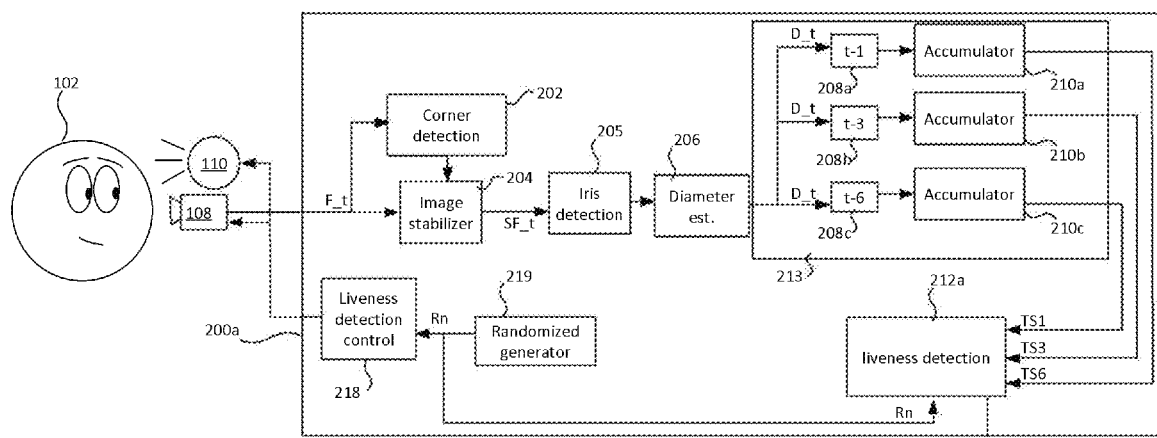
FIGS. 2A, 2B and 2C show various functional modules of a liveness detection system in a first embodiment of the described technology.

FIG. 2A shows a liveness detection system 200a in a first embodiment of the described technology. The liveness detection system 200a comprises the following functional modules: a liveness detection controller 218 connected to control the camera 108 and flash 110 (or alternatively the display 106); an image stabilizer 204 having an input connected to receive a video signal from the camera 204; a corner detector 202 having an input connected to receive the video signal and an output connected to the image stabilizer 204; an iris detector 205 having an input connected to receive a stabilized version of the image signal from the image stabilizer 204; a diameter estimator 206 having an input connected to an output of the iris detector 206 and an output; first second and third time differential modules 208a, 208b, 208c, each having a respective input connected to the output of the diameter estimation module 206; first, second and third accumulators 210a, 210b, 210c having respective inputs connected to the outputs of the first, second and third time differential modules 208a, 208b, 208c respectively; a first liveness detection module 212a having first, second and third inputs connected to outputs of the first, second and third accumulators 210a, 210b, 210c respectively; and a randomized generator 219 which generates randomized (e.g. random or pseudo-random) data Rn, and outputs the randomized data Rn to both the liveness detection controller 218 and the liveness detection module 212a. The modules 208a, . . . , 210c constitute a velocity measurement module 213.

Figure 2C:
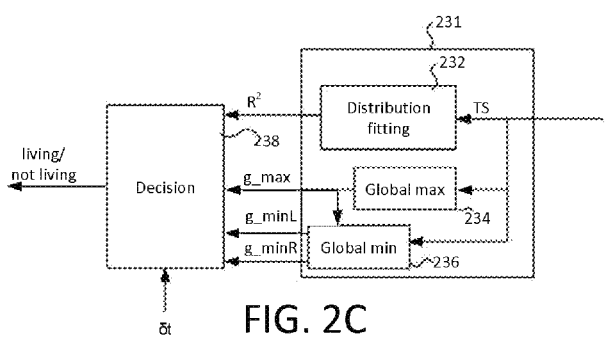
Figure 2B:
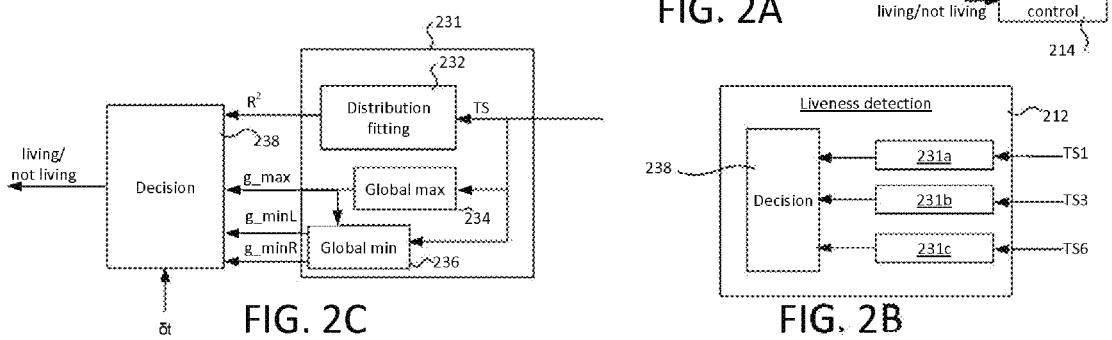
Figure 2D:
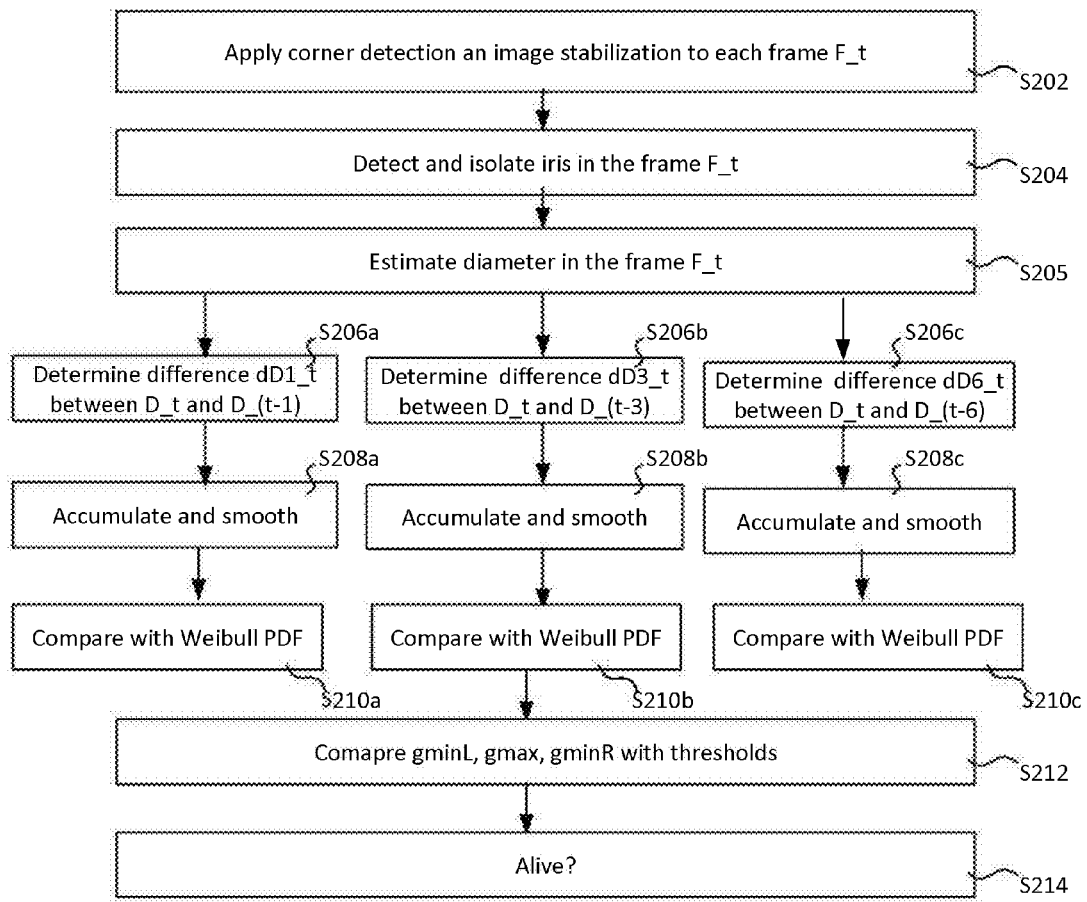
FIG. 2D shows a flow chart for a liveness detection method in the first embodiment.

FIG. 2B shows additional details of the liveness detection module 212a. The liveness detection module 212a comprises first second and third comparison modules 231a, 231b, 231c having inputs connected to the outputs of the first, second and third accumulators 210a, 210b, 210c respectively; and a decision module connected to receive inputs from each of the comparison modules 231a, 231b, 231c.

FIG. 2C shows how each of the comparison modules 231a, 231b, 231c (for which the general reference sign 231 is used) comprises a distribution fitting module 232, a global maximum estimation module 234, and a global minimum estimation module 236. The decision module has inputs connected to outputs of the modules 232, 234, 236, and an additional input connected to receive the randomized data Rn.

The randomized data Rn is in the form of one or more randomly generated parameters of the liveness detection process of the first embodiment, referred to as a pupil dilation ("PD") parameter set in the context of this embodiment.

The functional modules of the liveness detection system 200a are software modules, representing functionality implemented by executing the liveness detection app 114 on the user device 104, or by executing the back-end software 124 on the server 120, or a combination of both. That is, the liveness detection system 200*a* may be localized at a single computer device, or distributed across multiple computer devices.

The liveness detection system outputs a binary classification of the user 102, classifying the user 102 as either living or non-living, which is generated by the liveness detection module 212*a* based on an analysis of a moving image of the user's face captured by the camera 108.

The liveness detection system 200*a* of the first embodiment implements a technique for anti-spoofing based on pupillary light reflex. The technique will now be described with reference to FIG. 2C, which is a flow chart for the method.

Before commencing the technique, the liveness detection app 114 outputs an instruction to the user 102 that they should look at the camera 108, so that their face is within the camera's field of view. For example, the app 114 may display a preview of the video captured by the camera, with instructions as to how the user should correctly position their face within the camera's field of view.

In a liveness test performed according to Rn, the liveness detection controller 218 controls the camera 108 and camera flash 110 (or the brightness level of the display 106) of the user device 102 to perform the following operations. The camera flash 110 (or display 106) emits random light modulated pulses with a frequency of more than 0.33 Hz (~1 pulse every 3 seconds). The camera 108 stars recording video frames the moment that the flash 110 (or display 106) starts emitting the light pulses.

Each video frame comprises a high-resolution image of at least one of the user's eyes (right or left).

The recording continues for about three seconds in total, so as to capture a three second moving image of the user's face i.e. three seconds worth of video frames (typically between about 60 and 90 video frames for a conventional smartphone or tabled).

The light pulses are modulated based on the PD parameter set Rn, as generated by the randomized generator 219, in the following manner. At least two light pulses are emitted within the three second window—one at the start of the interval when recording commences, and at least one more whilst the recording is in progress. The two light pulses are separated in time by a randomly chosen time interval $\delta t$ that is defined by the PD parameter set Rn. In some implementations, three or four (or more) light pulses may be used, all having random temporal separations relative to one another.

The intensity of each of the later light pulse(s) is greater than that of the light pulse(s) preceding it. If light pulses of the same intensity were used each time, the pupillary response would diminish with each pulse due to the eye becoming accustomed to the light level of the pulses. Increasing the intensity of each pulse ensures a measurable physiological reaction by the pupil to each light pulse.

Every video frame that is recorded is timestamped i.e. associated with a time value defining when it was captured relative to the other frames. This enables the in the behaviour and position of the user's iris for each desired time interval. The notation F_t is used to represent a video frame having timestamp t hereinbelow and in the figures.

The following steps are then performed for each video frame F_t, for one of the user's eyes (or for each eye separately).

Figure 3:
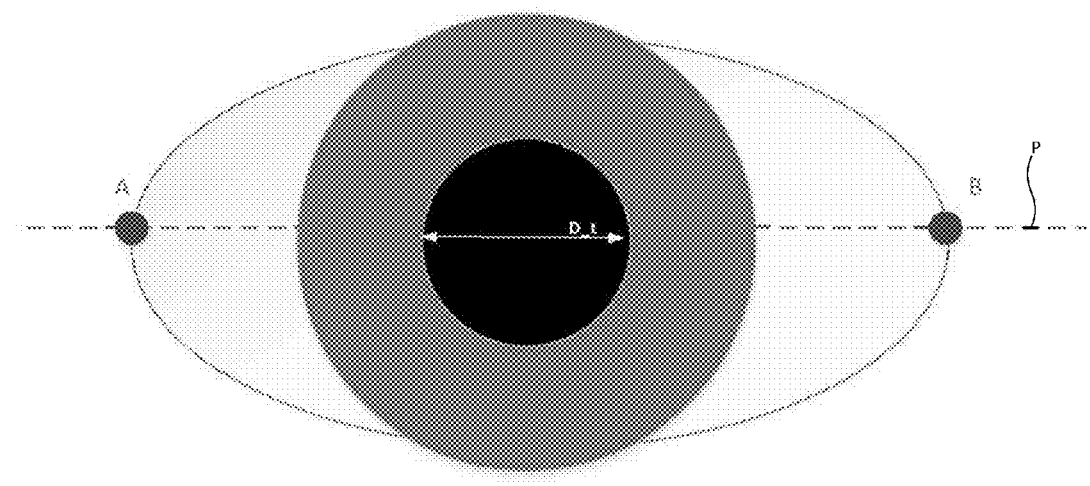
FIG. 3 illustrates some of the principles of an image stabilization technique.

At step S202, corner detection techniques are used to detect two reference points of the eye in the frame F_t—shown in FIG. 3 and labelled "A" and "B"—corresponding to the corners of the eye. Image stabilization is used to place the points A and B on a reference plane P common to all frames i.e. a rotational transformation is applied to the frame F_t, as necessary, so that the points A and B in all of the stabilized (i.e. rotated) versions of the video frames lie in the same reference plane P. In this example, the plane P is the horizontal place in the coordinate system of the frames, meaning that the points A and B are vertically aligned in all of the stabilized versions of the frames. This enables the movements and the size of the pupil to be isolated, as it removes the effects caused by any rotation of the user's head as a while during the capturing of the video.

The notation SF_t is used to represent the stabilized version of the frame F_t.

At step S204 the iris is detected and isolated in the stabilized video frame SF_t, using machine learning and blob detection techniques. The application of such techniques to iris detection are known in the art.

The diameter of the iris remains substantially constant—any changes in the diameter of the iris in the video can be assumed to be caused by movement of the user's head. These could be accounted for e.g. by applying a scaling transformation to the video frames to keep the iris diameter constant in the stabilized frames, though in practice this may be unnecessary as the iris diameter will remain substantially constant in the video provided the user keeps their head still during the recording.

By contrast, the diameter of the pupil changes in response to the light pulses—this is a physiological response to the light pulses, and is used at the basis for liveness detection in this first embodiment.

At step S205, the diameter "D_t" of the pupil in the frame SF_t s estimated in pixels.

Figure 5A:
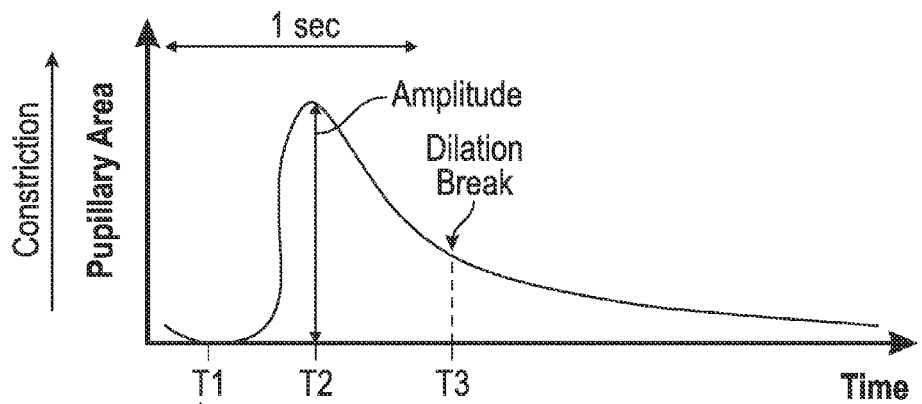
FIGS. 5A, 5B and 5C are graphs showing how the pupillary area of an eye responds to a light pulse stimulus.

FIG. 5A shows a graph illustrating how the diameter of the pupillary area is expected to change over time in response to a light pulse stimulus at time T1. The graph tracks the change of the pupillary area of the eye after a light stimulus of medium/high intensity is applied to the eye.

Immediately following the stimulus the pupil is rapidly contracted (i.e. its diameter decreases) in response until reaching a maximum contraction (minimum diameter) at time T2, after which it gradually dilates (i.e. its diameter increases) back towards its original contraction. At time T3, approximately 1 second after the stimulus time T1 there is a noticeable genuflection in the response curve i.e. a relatively sudden decrease in the rate of pupil dilation. This is called the "dilation break".

Figure 5B:
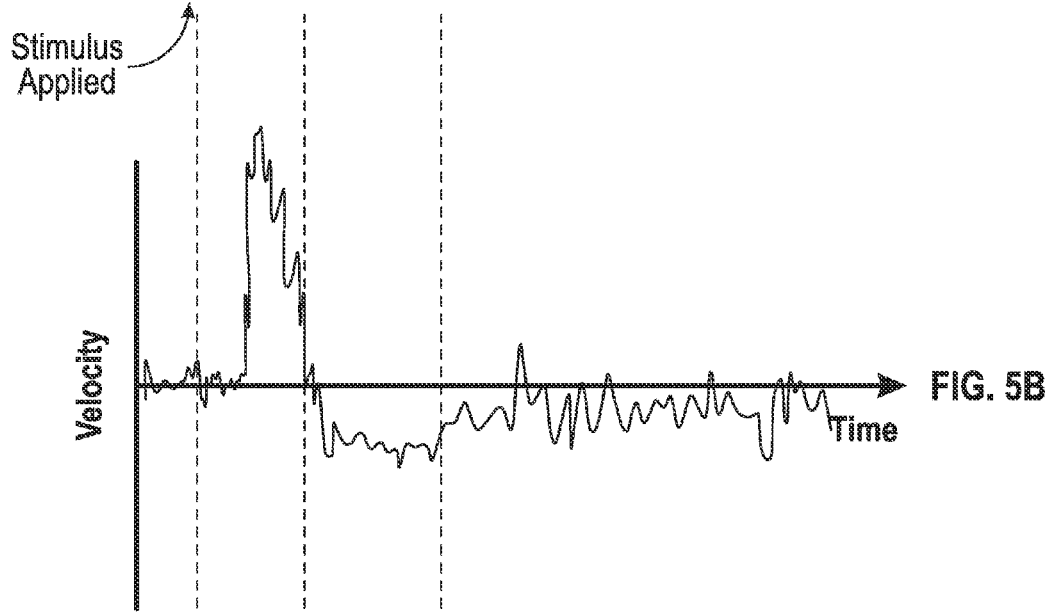

FIG. 5B shows the rate of change in the pupil diameter over the same time interval i.e. the velocity of contraction (positive velocity) or dilation (negative velocity). The pupil diameter exhibits rapid, essentially random fluctuations. Nevertheless, the velocity response has an overall structure over larger time scales that is still evident.

Figure 5C:
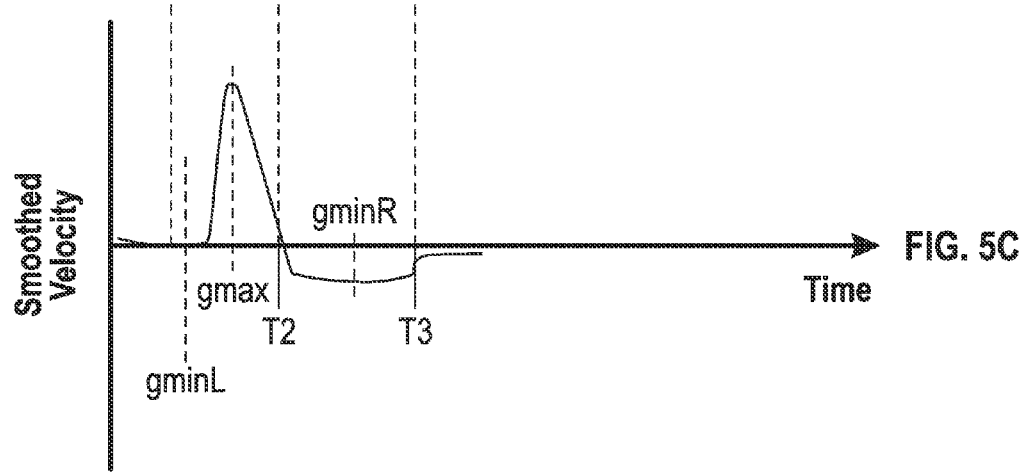

FIG. 5C shows a smoothed version of the velocity curve of FIG. 2C, in which the rapid fluctuations have been averaged out by taking a windowed average of the velocity curve with a window large enough to eliminate the fluctuations but small enough to preserve the overall structure.

As can be seen in FIG. 5C, at time T2 the velocity is zero. Between T1 and T2, the velocity reaches its local peak value (i.e. local maximum) at a time g_max. The smoothed velocity curve has local minima immediately to the left and right of time g_max, at times g_maxL and g_maxR respectively. These are immediate in the sense of being closest in time i.e. such that that there are no other local minima between g_max and g_minL or between g_max and g_minR.

The time g_minL is near to the time T1 that the stimulus is applied. The time g_minL is after the time T2 (at which the pupil stops contracting and starts dilating) but before T3 (the dilation break, at which the pupil dilation slows suddenly). That is, g_minL occurs in the well-defined temporal range between T2 and T3.

The physiological response by a real, human pupil to the stimulus is such that g_max, g_minL and g_minR are expected to satisfy a certain relationship—specifically that g_max−g_minL is no more than a first known value Δt1 and g_minR−g_max is no more than a second known value Δt2. The second interval Δt2 is of the order of a second, whereas the first interval Δt1 is at least an order of magnitude lower.

At the times g_max, g_minL and g_minR, the acceleration of the pupil is zero.

Figure 5D:
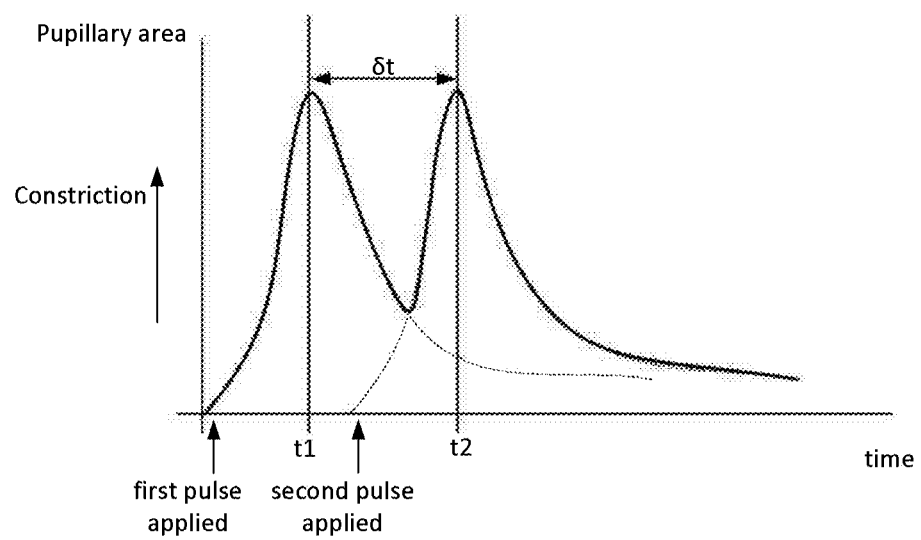
FIG. 5D is a graph showing how the pupillary area response to two light pulses in relatively quick succession.

As mentioned above, at least two light pulses, having a random temporal separation, are emitted whilst the video is recorded. FIG. 5D shows the pupillary response to the two light pulses separated in time by an interval δt. In response to the first pulse, the pupillary area traces the response curve of FIG. 5A, until the second pulse is applied causing the eye to retrace the response curve of FIG. 5A a second time. The intensity of the second pulse is greater than that of the first pulse by an amount such that the second pulse causes substantially the same level of contraction as the first pulse. That is, the curve of FIG. 5D corresponds to two instances of the curve of FIG. 5A, separated in time by δt.

FIGS. 5A-5D are provided simply to aid illustration—as will be appreciated, they are highly schematic and not to scale. Velocity curves computed from measurements of real human eyes may exhibit more complex structures, but are nevertheless expected to satisfy the aforementioned relationship.

A differential dD of the pupil diameter D_t is estimated on different time intervals by:

Comparing the pupil diameter D_t at time t with the iris diameter D_(t−1) at time t−1 (S208a), to compute a difference "dD1_t" between D_t and D_(t−1)—e.g. dD1=D_t−D_(t−1) (S206a);

Comparing the pupil diameter D_t at time t vs iris diameter D_(t−3) at time t−3, to compute a difference between "dD3_t" and D_(t−3) (S206b);

Comparing the pupil diameter D_t at time t vs iris diameter D_(t−6) at time t−6, to compute a difference "dD6_t" between D_t and D_(t−6) (S206c).

Figure 4:
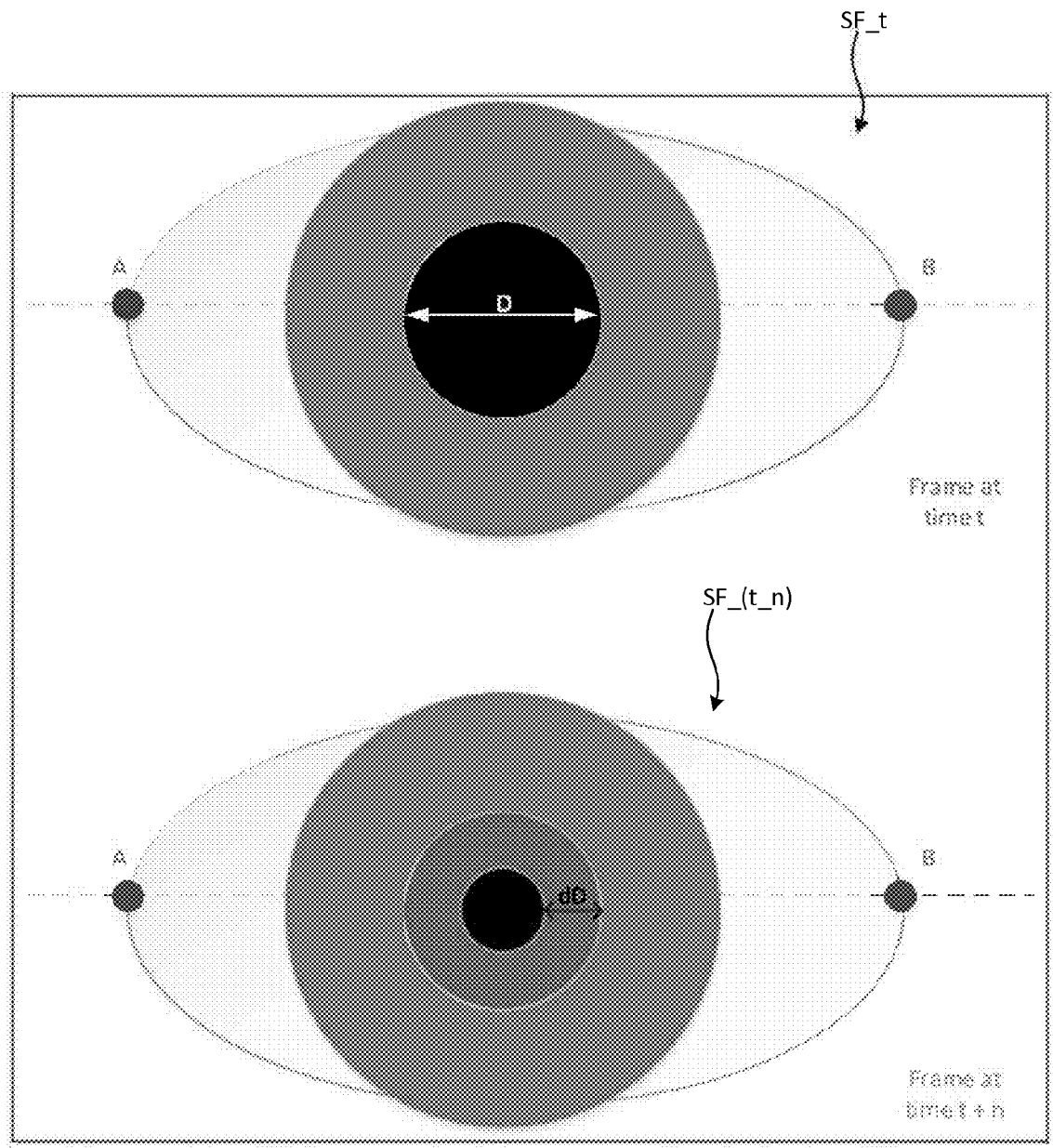
FIG. 4 demonstrates a pupil's response to a light pulse stimulus during a liveness detection process.

FIG. 4 illustrates and example of a differential dD between time t and time t+n (n=1, 3 or 6).

At steps S208a, S208b, S208c respectively, each of the diameter differentials dD_t is accumulated over time to form a respective velocity distribution in the form of a time series of differential values:

( . . . ,dD_T,dD_(T+1),dD_(T+2), . . . )

to which a moving average is applied in order to smooth it. The smoothed version of each time series is denoted TS1, TS3 and TS6 respectively, below and in the figures, and describes the rate at which the size of the pupil is changing at different points in time (i.e. the pupil's velocity).

The liveness detection module 212a analyzes each time series TS1, TS3, TS6 in order to identify if its fit closely to a Weibull probability density function (PDF), sometimes referred to as a Frechet PDF. The analysis is performed by computing fit measure for the time series.

The Weibull PDF represents the expected pupillary response to the two light pulses as illustrated in FIG. 5D, and has predetermined coefficients, set to match the expected behaviour of human eyes in response to the two light pulses, as illustrated in FIGS. 5A-5D. The behaviour of human eyes is sufficiently predictable across the human population, that most human pupils will exhibit a physiological response to each light pulse that fits the Weibull PDF to within a certain margin of error. No machine learning techniques are needed to set the parameters—the Weibull PDF for a given δt can be computed efficiently (i.e. using minimal processing resources) based on closed-form equations for a given value of δt.

An example of a suitable fit measure is a weighted sum of squared errors $R^2$, defined as:

$$R^2 = \sum_{o \in TS} \frac{o - e_o}{\sigma^2}$$

where o is an element of the smoothed time series TS (the summation being over all elements in TS), $e_o$ is the value of o predicted by the PDF, and $\sigma^2$ is the variance of the time series TS. Three $R^2$ metrics are computed separately—one for each smoothed time series TS1, TS3, TS6.

For each of the at least two light pulses, a local maximum g_max of each time series is computed as:

g_max=arg_max_t(dD_t)

That is, g_max is the time t at which the rate of contraction in response to the applicable light pulse is greatest (see FIG. 5C, and the accompanying text above). The times g_minL and g_minR immediately before and after g_max are also computed for each light pulse and for each time series TS1, TS3, TS6.

To determine whether the user is a living being or not, the decision module 238 performs the following operations for each time series TS1, TS3, TS6.

The weighted errors measure $R^2$ of that time series is compared with a threshold.

For each light pulse, a time difference g_max−g_minL between g_minL and g_max is computed, and compared to a first time threshold dtthreshold1. A time difference g_minL−g_max between g_max and g_minR is also computed and compared to dtthreshold2. The first and second time thresholds dtthreshold1, dtthreshold2 are set to match the expected time differences Δt1 and Δt1 respectively (see text above accompanying FIG. 6C).

The separation in time between the two response curves is measured for each time series, for example by measuring the separation in time between the times of peak contraction at which dD_t=0. e. corresponding to times t1 and t2 in FIG. 5D. For each additional light pulse used in excess of two, an equivalent temporal separation is measured and compared to the known (random) separation of that light pulse from one of the other light pulses.

If and only if:

$R^2$ is below the threshold (indicating a good fit of the time series TS to the Weibull graph for each time series;

both of the time differences are within their respective time thresholds dtthreshold1, dtthreshold2 for each time series and each time pulse; and The measured separation between times t1 and t2 matches the random time interval δt i.e. t2−t1, δt to within a predetermined margin of error for each time series (and for each δt in the case of three or more light pulses)

then the decision module 256 concludes that the user 104 is alive. That is, if and only if all of these criteria are fulfilled does the liveness detection system 200a conclude that the user 104 is a living being. In the event that an entity masquerading as a living being assumes the role user 104, such as a photograph or detailed model of the user 102, it will not exhibit the necessary pupil response to satisfy these criteria, so the system will correctly identify it as non-living.

Whilst the above uses a Weibull PDF, more generally, any suitable extreme value theory probability distribution function can be used in place of the Weibull PDF to model the expected response of the human pupil of FIG. 5A and thereby achieve the same effect.

The random separation δt between the two light pulses is of the order of one second, corresponding to low frequency modulations. To provide additional robustness, randomized high frequency modulations of the light pulse can also be introduced. In this case, the high frequency modulations are compared with reflections from the eye and a match between the reflections and the high-frequency modulations is also required for the entity to be identified as living.

The technique of the first embodiment can also be implemented using a single light pulse, at a random time relative to the start of the video. The pupillary response in the video is compared with the random timing to check whether it matches.

A liveness detection technique which uses modulated illumination is disclosed in published UK patent application GB2501362. GB2501362 relates to an authentication process, in which a code is sent from a server to a user-device equipped with a source of illumination and a camera capable of capturing video imagery of an online user. The user device modulates the source of illumination in accordance with the code, and at the same time captures video imagery of the user.

In GB2501362, the pattern of illumination on the user's face is extracted and analyzed to deduce the code used to control it. The extracted, code is then compared to the transmitted code. However, GB2501362 fails to recognize the possibility of using an expected physiological, human response to randomized light pulses illumination as a basis for liveness detection.

Figure 6A:
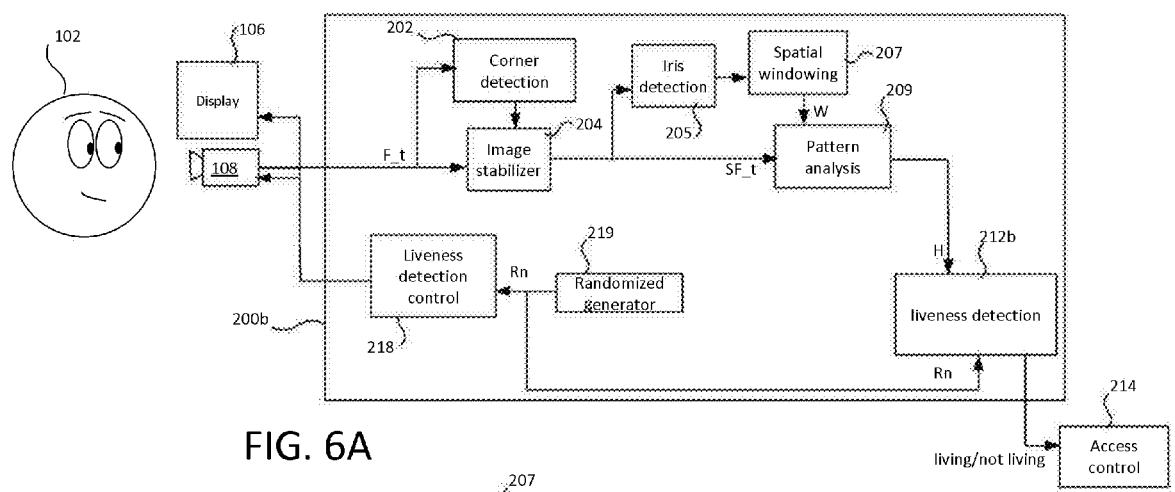
FIGS. 6A and 6B show various functional modules of a liveness detection system in a second embodiment of the described technology.
Figure 6B:
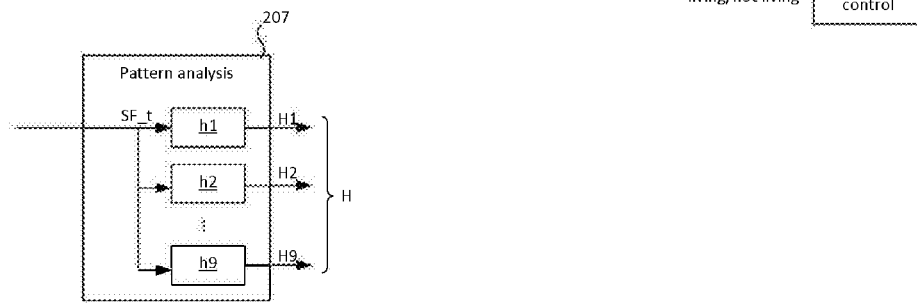

FIG. 6B shows a block diagram of a liveness detection system 200b in a second embodiment. The system 200b implements a technique for anti-spoofing based on tracking the iris movement by presenting elements at random positions of the screen.

In the second embodiment, in a liveness test performed according to Rn, the liveness detection controller controls the display 106 and the camera 108 of the user device. In the second embodiment, the liveness detection controller uses randomized data Rn generated by the randomized generator 219 to display randomized display elements at randomized locations on the display 106 in a liveness detection test. The randomized data Rn is in the form of one or more parameters that define the display locations, referred to as an eye tracking ("ET") parameter set in the context of the second embodiment.

The corner detector 202, image stabilizer 204 and iris detector 205 are connected as in the first embodiment, and perform the same operations. The system 200b comprises the following functional modules, in addition: a spatial windowing module 207 having an input connected to an output of the iris detection module 205; and a patent analysis module 209 having an first input connected to an output of the spatial windowing module 207 and a second input connected to receive the stabilized video frames from the image stabilizer 204; and a second liveness detection module 212b.

FIG. 6B shows additional details of the pattern analysis and liveness detection modules 207, 212b. The patent analysis module comprises a plurality of histogram determination modules h1, . . . , h9 (nine in this example), each of which is connected to receive the current stabilized video frame SF_t and has a respective output connected to a respective first input the liveness detection module 212b.

Returning to FIG. 6A, the liveness detection module 212b has a second input connected to receive the randomized data Rn, and outputs a binary classification of an entity subject to the test (the user 102 in this example) as living or non-living, as in the first embodiment.

The liveness detection technique implemented by the system 200b of the second embodiment will now be described with reference to FIG. 6C, which is a flow chart for the method. The method is based on tracking the iris movement by presenting elements at random positions of the screen.

A device displays a 'following element' on its screen that moves to the predetermined positions (randomly assigned) that correspond to a block of a square grid of predefined size. These positions are not set by the user and are intended to guide the user to track their eye movement. The user is requested to track the random movements with their eyes. During the whole process the device is recording the eye movements of the user.

The steps of the technique are the following:

At step S602, the liveness detection controller 218 controls the display 106 of the user device 104 to display a display element on its screen which moves between random display locations, defined by the randomized data Rn.

Figure 7A:
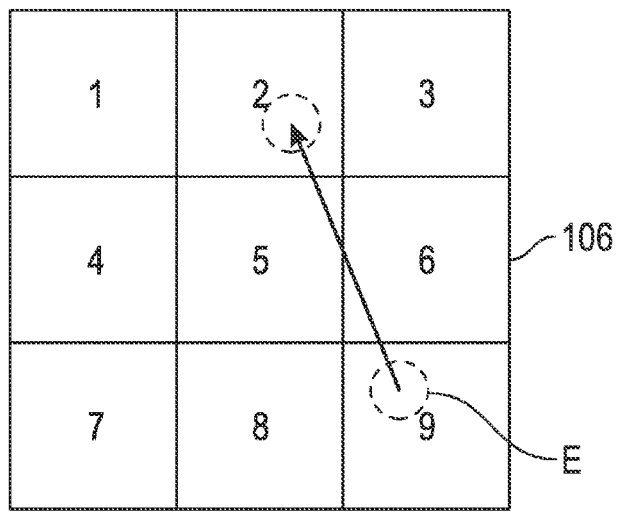
FIG. 7A illustrates a display element exhibition randomized motion.

This is illustrated in FIG. 7A, which shows a display element moving from a randomly chosen location in the bottom block ("9") of the grid to the top middle block ("2") of the grid. The possible display locations correspond to the blocks (equivalently referred to herein as "regions" or "sectors") of a 3×3 grid defined in relation to the display 106, which are predetermined by the system 200b (e.g. at the user device 104) but not by the user 102. The user 102 is requested to track the random movements with his eyes. A high-resolution moving image of the user's face is captured by the camera 108 as the user follows the moving display element (S604).

Every video frame that is recorded is timestamped in order to know precisely the behaviour and position of the iris for each time interval, exactly as in the method of the first embodiment.

The following operations are performed for each frame F_t of the moving image, for at least one of the user's eyes (or for each eye separately).

At step S606, corner detection and image stabilization algorithms are applied to the frame F_t in order to place the points A and B on the same plane P so that the movements and the size of the iris ca be isolated. Step S606 corresponds exactly to step S202 of FIG. 2C, and the description applies equally in this instance. The iris in the frame F_t is detected using machine learning and blob detection techniques (S608, corresponding exactly to step S204 of FIG. 2).

Figure 7B:
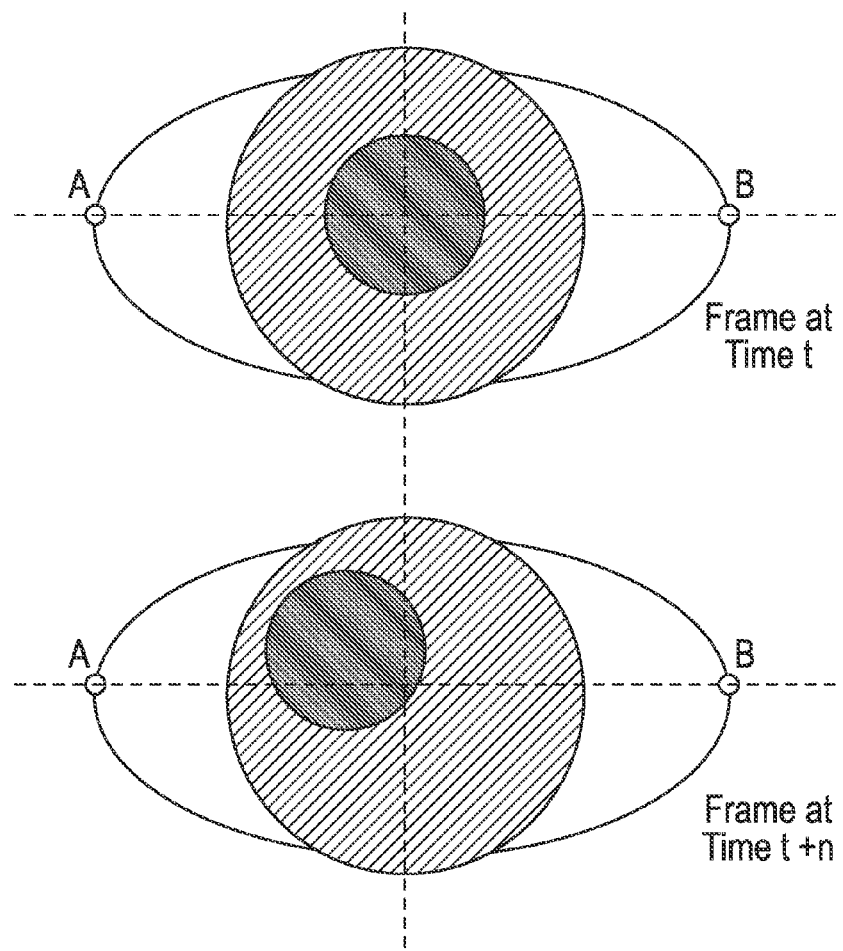
FIG. 7B illustrates movements of an eye when tracking a visible element.

As the display element E moves across the display, the eye follows it causing discernible motion of the pupil relative to the plane P. This is illustrated in FIG. 7B (note the eye movement illustrated in FIG. 7B does not correspond to the display element movement shown in FIG. 7A).

Figure 8:
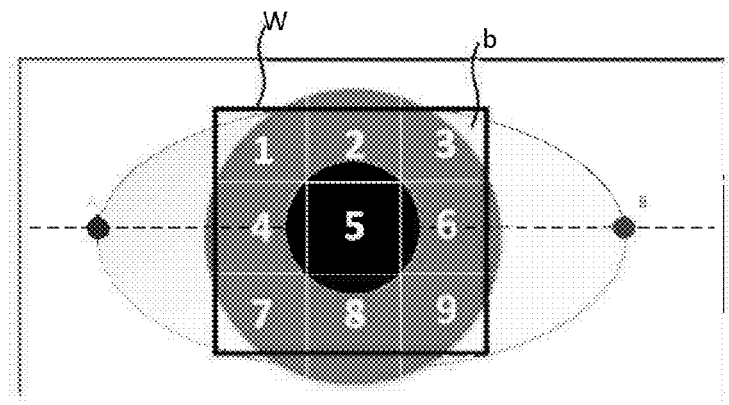
FIGS. 8 and 9 illustrate some of the principles of an eye tracking technique.

At step S610, a window region around the iris ("iris window") is identified by the spatial windowing module 207, based on the iris detection of step S608. The window W is shown in FIG. 8. The isolated iris window is divided into a region of 3×3 blocks, labelled "1" through "9" in FIG. 8, corresponding to the 3×3 blocks of the grid defined in relation to the display. That is, the window W is divided into N blocks, where N=9 in this example.

Figure 10A:
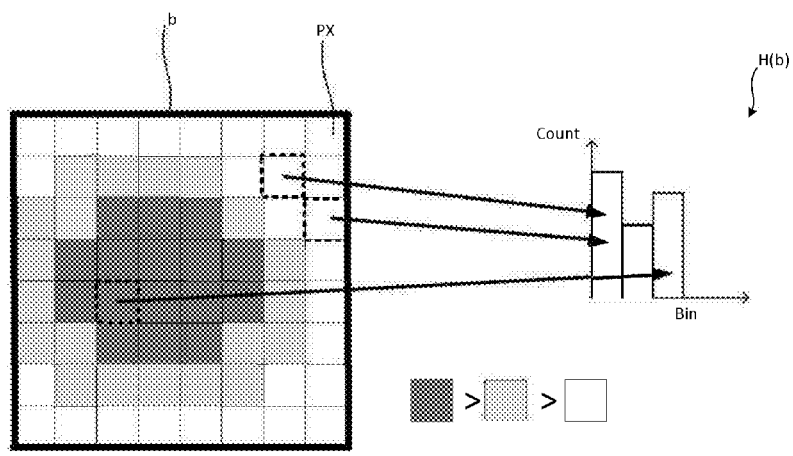
FIGS. 10A and 10B illustrate a process by which histograms describing movements of an eye can be generated.

At step S612, for each block, a respective histogram is generated based pixel values. FIG. 10A illustrates the technique used to generate the respective histogram. FIG. 10A shows an exemplary block b formed of an array of pixels. Each of the pixels can take one of three values, represented by different shading (note this is an extremely simplified example presented to aid understanding).

A histogram H(b) is for the block b is generated. The histogram H(b) has a bin for each possible pixel value (so three bins in this extremely simplified example), and that bin defines the number of pixels in the block b having that value (i.e. the count for that bin).

In reality, there may be thousands of different pixel values though in some cases the range may be reduced using suitable quantization i.e. so that each bin of the histogram corresponds to a range of multiple pixel values—in the preferred technique described below, extreme quantization is applied whereby each pixel is quantized to one of two values representing light and dark.

Figure 10B:
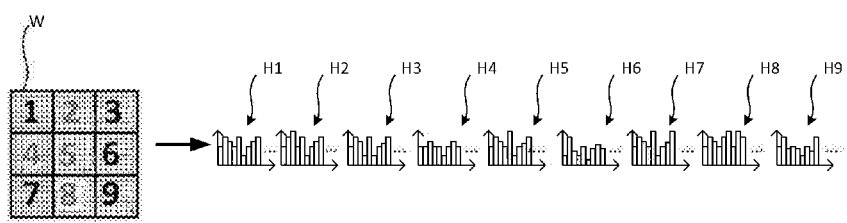

An individual histogram (H1, . . . , H9) is generated in this way for each of the nine blocks of the iris window, as illustrated in FIG. 10B. The set of nine histograms is denoted H.

Figure 9:
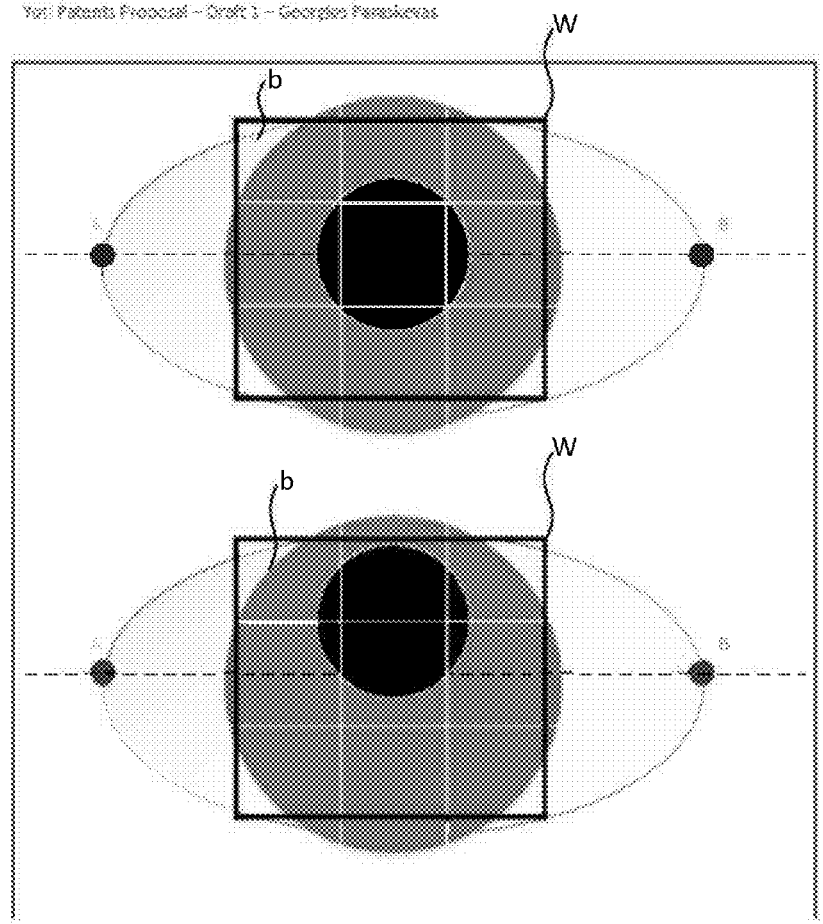

The histogram for a block b dominated by dark pixels—as occurs when pupil is in that block in the video—is measurably different from the histogram of a block b dominated by the lighter colours of the iris and/or sclera of the eye. Thus, as the eye moves between different blocks b of the window W (see FIG. 9), the histograms H change accordingly, in a predictable manner. This allows the movement to be examined without having to rely on machine learning techniques.

Whenever a movement of the element on the display 106 occurs, a change in the histograms H is expected to occur. Thus, for each movement of the display element on the display 106, the change in the histogram of the iris movement is compared with the change in the location of the display element in order to evaluate if the iris moved to the correct block i.e. as would be expected if the eye were a real human eye tracking the display element. If after a predetermined number of movements the system identified that the user didn't follow the element correctly, the user would be classified as trying to spoof the system.

FIGS. 10A and 10B illustrate a situation in which pixel values are used to generate histograms for blocks b directly. However, in a preferred technique, the blocks b are first divided into sub-blocks, and block values are assigned based on the sub-blocks.

In this preferred technique, before generating the histograms for the frame F_t, the frame F_t is converted to grayscale i.e. each pixel is converted to a single value carrying only intensity information.

Figure 13:
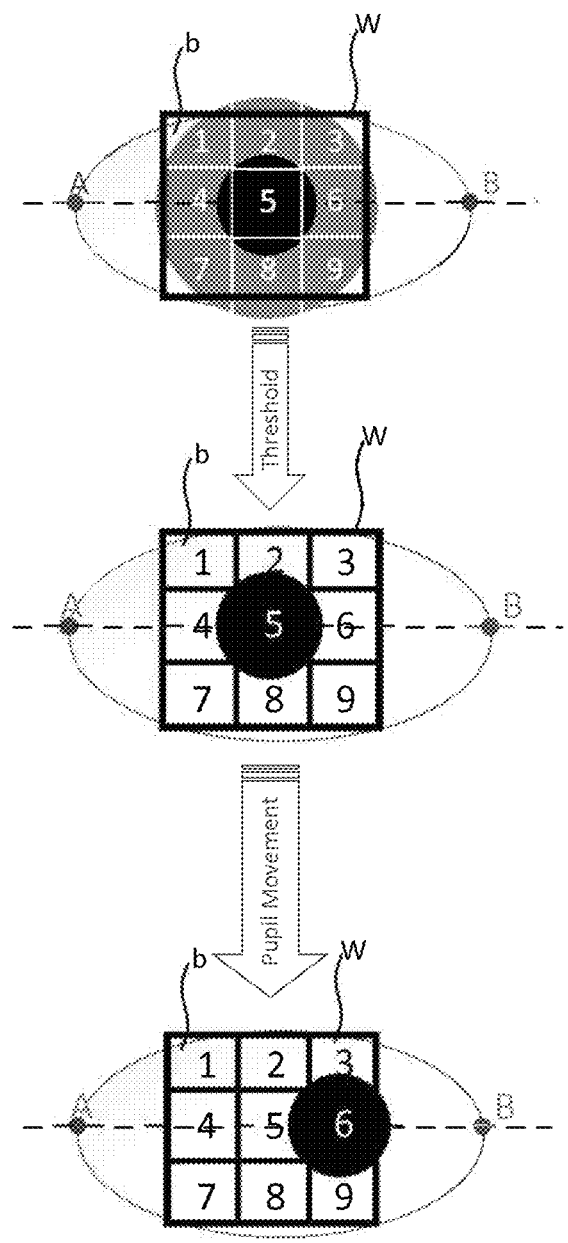
FIG. 13 illustrates how an eye movement is manifest in a sequence of grayscale video frame images.

As shown in FIG. 13, binary thresholding is applied to the grayscale image, such that if the value of a pixel is less than a predetermined threshold then its value is set equal to black (value "1"); otherwise set it equal to white (value "0"). This allows the pupil to be isolated completely. The thresholding removes the iris texture (in this example, the movement of the pupil alone is used to track eye movements)

Blob detection of high circularity is then applied to the quantized image in order to identify and extract the pupil of the eye, as follows. The location of the pupil is determined by a novel type of Local Binary Pattern, referred to herein as a motion binary pattern (MBP). The motion binary pattern is constructed with the following process:

As shown in FIG. 14A, a region split is established, whereby each block b is divided into a predetermined number of smaller blocks "sb" ("sub-blocks") arranged as a square—8×8 sub-blocks sb per block b in this example, so M=64 sub-blocks sb per block b in total. Each sub-block sb comprises one or more pixels—multiple pixels in this example.

If a sub-block sb has a minimum of a third (about 33%) of its pixels equal to 0 then a value of "1" is assigned to the sub-block; otherwise it is assigned a value of "0". In this manner, a sequence "SEQ(b)" of M binary values is assigned to each block b (one binary value per sub-block)—one for each sub-block. In other words, each block b (e.g. each of the 3×3 blocks) has M sub-blocks and each sub-block is composed of square regions of pixels. The value 1 or 0 is assigned to each sub-block (based on the >=33% thresholding).

This allows a block to be represented by a single number ("block value") by concatenating all the binary values of its constituent sub-blocks. For 8×8 (=64) sub-blocks for each block, the single number is in the range of 0 to 2^64. The whole iris window W is represented by N such values—one for each block (where N is the number of blocks e.g. N=9).

As illustrated in FIG. 14B, a pupil movement results in a change of the value of each block within the expected number of sequences. FIG. 14B illustrates a case the change of value of a MBP block b when detecting an edge in motion (the "1" value sub-blocks in FIG. 14B correspond to the edge region of the dark pupil).

By analysing the sequences of processed eye movements based on the MBP approach and comparing them to the expected sequence of MBP values according to the predefined 'following elements' it is possible for the system to determine if the user is a live person. For a given set of random locations, a probability density function modelling the expected movements of the eye can be cheaply generated, again using closed-form equations (without any need for machine learning) and compared with the observed histograms.

The ordering and labelling of the bins is immaterial, provided whichever convention is adopted is applied consistently.

To further increase the level of robustness of this process, in some cases the display element is a randomly selected word. The word changes when the display element moves. The user is also required to read the word as the test progressed. The moving image is processed to identify the user's lips, and lip-reading techniques are used to determine whether the user is speaking the correct word.

In other embodiments, randomly selected words are displayed at the same location on the display, and lip reading alone is used for liveness detection (i.e. with no eye tracking).

Preferably, the randomized locations at the display element is displayed are selected based on the randomized data Rn and, in addition, based on at least one shared secret between the user device 6 and the remote system 130. The shared secret can for example be a user-defined shape, such as an elliptical curve. An elliptical curve requires minimal storage overhead, as it can be parameterised by a small number of parameters.

Figure 12A:
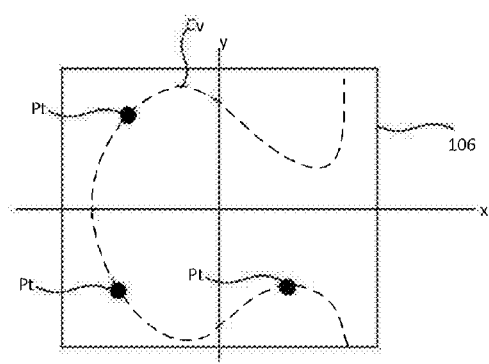
FIGS. 12A and 12B illustrate some principles of a liveness detection technique that is based in part on a shared secret between a user device and a server.

An exemplary elliptical curve Cv is shows in FIG. 12A. The user 102 defines the curve at the user device 104, for example by tracing it on the device's touchscreen or using a mouse/trackpad etc. Geometric data of the curve is both stored securely at the user device 106, encrypted based on a code (e.g. PIN) inputted by the user 102, and transmitted to the remote system 130 via a secure channel for storage thereat. Thus the geometry of the curve is stored both at the user device and the remote system 130. In order to change the curve, the user 102 must input the code to decrypt it. Every time the curve is changed, the version at the remote system 130 is updated to reflect the changes.

The ET parameter set defines the point on an ellipse in terms of one-dimensional coordinates, defining a length along the ellipse. For example, in a quantized system, each ellipse constitutes a finite set S={n|n=1, ..., N} of N points in two-dimensional space. Each randomly selected parameter can be represented by a single parameter defining an index of a point in S.

During the liveness detection process, the display element is displayed at display locations corresponding to randomly selected points Pt on the curve Cv, selected by the user device 104. The curve Cv itself is not displayed. When this technique is used, the user device 104 communicates the eye images to the remote system 130, or information about the movements of the eyes in response to the random display element derived from the eye images. The user device 106 does not transmit any other information about the points Pt that it has selected—these are conveyed to the remote system 130 only through the movements of the user's eyes.

The ET parameters Rn determine which points on the curve will selected in a deterministic manner i.e. if the ET parameters Rn and the curve Cv are known, it is always possible to know with certainty which points the user device 106 will select.

Thus, because a copy of the curve Cv is stored at the remote system 130, and because the remote system 130 has access to the randomized data Rn, the remote system can reconstruct the points Pt as selected by the user device based on its own copy of the curve.

This provides an additional layer of robustness for the following reasons: if the user device 106 uses the incorrect curve i.e. that does not match the version stored at the remote system 130, the user's eyes will not be those expected by the server. Thus, for the liveness detection technique to succeed, the user device 106 must know the shared secret in the form of the curve Cv. This prevents a device which does not have access to the securely-held shared secret from being used to access e.g. the database 132 in the remote system 130. In other words, based on its knowledge of the shared secret, the remote system knows which points on the curve Cv the user device should have selected given its own knowledge of the shared secret. Should the wrong points be selected as part of an attempted spoofing attack, the attack will fail as a consequence.

Both of the above described techniques consider movement of the pupil in response to certain stimuli. Alternatively or in addition, the changes in the pattern of the iris can be used to the same end. The diameter of the iris is constant, however the structure of the iris exhibits intricate variations (iris pattern) that are visible as colour patterns. As the eye reacts to the pulse or display element stimulus, these patters will change. This can be measured, for example, by identifying and tracking distinct points on the iris in response to the relevant stimulus. A noise filtering algorithm may applied to the image, and the tracking based on the noise-filtered version. A set of differential equations is applied to select visible dark and/or light spots in the noise-filtered image for tracking. Again, the detected movements are compared to expected data that is generated form closed-form equations without the need for machine learning.

Figure 12B:
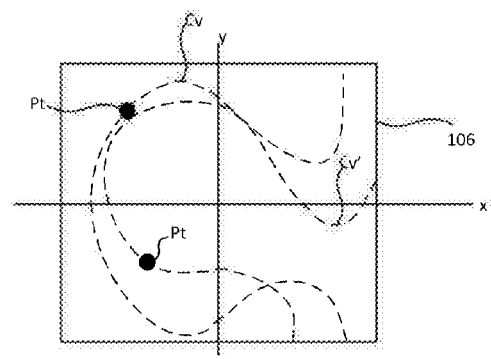

Optionally, as illustrated in FIG. 12B, the randomized data may also define a transformation of the curve e.g. a scaling and/or rotation of the curve over time, so that a second point Pt2 is a point on a transformed version Cv' of the curve relative to the version Cv used on which a first point Pt1 is selected.

As an alternative to eye tracking, the user may indicate the location of the display element as they perceive it using some other input device of their user device 104, such as a touchscreen, trackpad, mouse etc. In this case, the user selects (e.g. touches or clicks on) the point on the screen where the display element is displayed, and their inputs are compared to the expected display location(s).

In any of the above embodiments, the binary classification outputted by the system liveness detection system (e.g. 200*a*, 200*b*) may, for example, be conveyed to an access control module 214 of the server 120, so that the access control module 214 can decide whether or not to grant the user 102 access to the remote system 130 based on the classification. For example, access may be granted only if the user 102 is identified as a living being by the liveness detection system.

In either of the above embodiments, the liveness detection system 200*a*/200*b* may, instead of generating a binary classification of the user 102 as living/non-living, generate a confidence value denoting the system's confidence that the user is living or non-living e.g. a probability that the user 102 is living or a probability that they are non-living. In this case, the access controller 214 receives the probability, and can perform its own classification.

Figure 11:
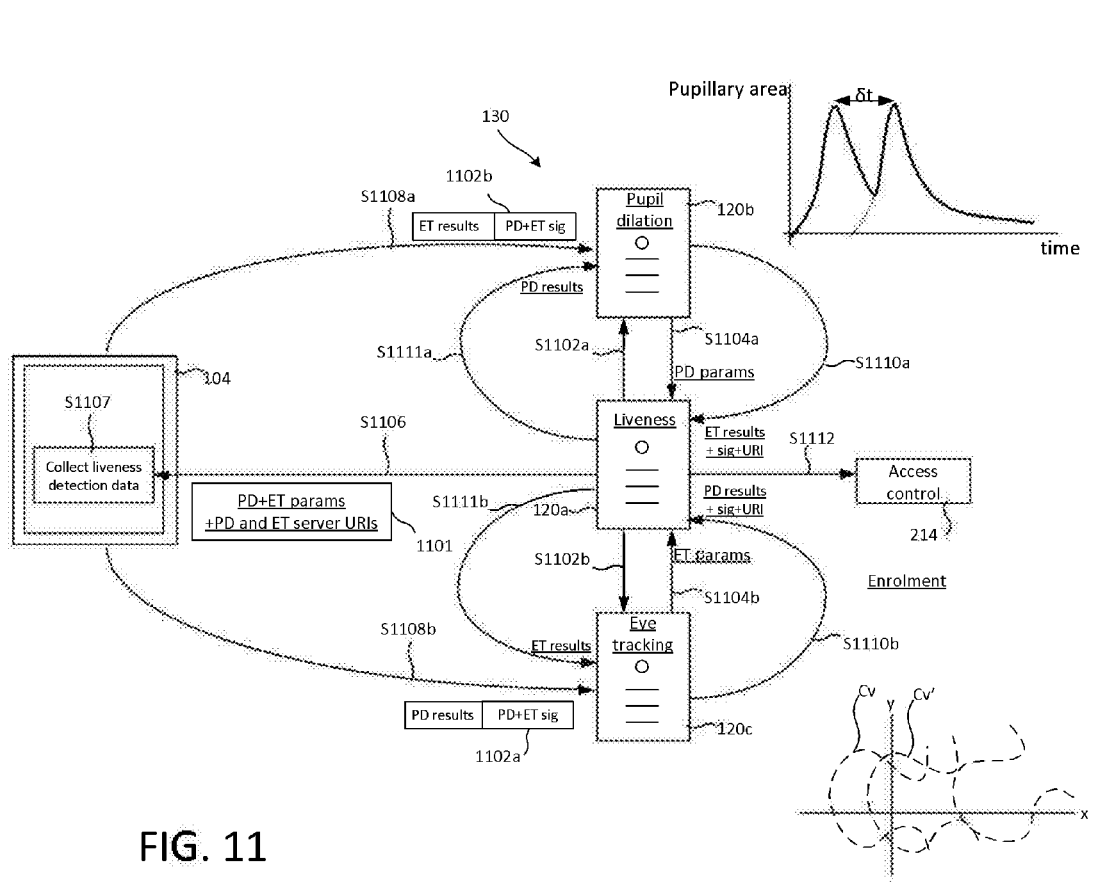
FIG. 11 shows a signalling diagram for a liveness detection technique according to a third embodiment.

FIG. 11 illustrates a liveness detection technique in a third embodiment, which combines the techniques of the first and second embodiments.

Three separate servers 120*a*, 120*b*, 120*c* and 120*d* of the remote system 130 are shown—a liveness (control) server 120*a*, and two liveness processing servers: a pupil dilation server 120*b*, and an eye tracking server 120*c*.

The liveness server 120*a* coordinates the liveness detection technique of the third embodiment. The pupil dilation server 120*b* implements the liveness check of the first embodiments, based on pupil dilation. The eye tracking server 120 implements the liveness check of the second embodiment, based on eye tracking. At steps S1102*a* and S1102*b*, the liveness server 120*a* requests a PD parameter set and an ET parameter set from the pupil dilation server 102*b* and the eye tracking server 102*c* respectively.

The PD parameters are for implementing the process of the first embodiment, i.e. based on pupillary response to pulsing, and defines one (or more) randomly selected temporal separation between two (or more) light pulses (or one light pulse at a random time in the video). The ET parameters is of the kind used in the second embodiment, i.e. based on display elements at random display locations, and when combination with the user-selected curve Cv defines a set of spatial points selected at random, at which the display element is displayed.

In the third embodiment, importantly, the randomness of the process is generated server-side.

After receiving the PD parameters from the pupil dilation server 120*b* (S1104*a*) and the ET parameters from the eye tracking server 120*c* (S1104*b*), the liveness server 120*a* transmits the PD and ET parameters to the user device 104.

At step S1107 user device 104 uses the PD and ET parameters to instigate the liveness detection processes of the first and second embodiments respectively by performing the randomized pulse test according to the PD parameters and the randomized display element test according to the ET parameters i.e. emitting light pulses at random interval(s) based on the PD set and displaying display element(s) at random locations selected on the user's curve Cv based on the ET parameter set. This may be triggered by the liveness server 120*a* requesting a liveness check from the user device 106, or the user device requesting a liveness detection check form the liveness server 120*a*. The PD and ET sets are transmitted from the liveness server 120*a* to the user device 104 at step S1107 in an instigation message 1101.

The instigation message also comprises a network address of the pupil dilation server 120*b* and a network address of the eye tracking server 120*c*. Each network address defines a respective network endpoint, and may for example be a URI (Uniform Resource Indicator). These network addresses are different from the source network address of the instigation message 1101 (i.e. the address of the liveness server 120*a* that transmits the message 1101).

The URIs used are uniquely allocated to the user device 104, and each constitutes a shared secret between the user device 104 and the remote system 130.

The two processes are linked, in that the randomized display element of the second process is displayed at the randomized locations defined by the ET set within a predetermined time interval commencing with the first light pulse of the first process. That is, the processes are coordinated so that the display element is displayed to the user at the randomized locations at a time when their eyes are still reacting to the light pulse i.e. while they are still temporarily slightly stunned by the pulse. The movements of the eye when tracking the display element are measurably different when the eye is in this stunned state (as compared with an un-stunned eye), and these differences are predictable across the population, which is exploited as part of the liveness detection procedure of the third embodiment. At least one moving image is captured over a time interval that spans both the pulsing and the displaying of the display element, which constitutes the data that forms the basis of the first and second liveness detection processes. Three points on the user's curve Cv are used, with the display element moving between these three points during the capture process.

At steps S1108*a* and S1108*b*, the user device 104 transmits information collected at step S1107 to both the pupil dilation server 120*b* and the eye tracking server 120*c*, in at least one first message 1102*a* and at least one second message 1102*b* respectively.

In some cases, no or minimal image processing is performed at the user device 106, and the moving image(s), or a minimally processed version thereof, is transmitted to the servers 12*b*, 120*c* for processing at the remote system 130 in the first and second messages 1102*b* respectively. In these cases, the remote system 130 performs the majority of the steps of the liveness detection process of the first embodiment, and in particular computes the changes in the pupil diameter over time; the remote system 130 also performs the majority of the steps of the liveness detection process of the second embodiment, and in particular computes the histograms representing the blocks of the iris window over time.

In other cases, the user device performs the majority of this processing. In particular, the user device computes the changes in the pupil diameter and the histograms, which it transmits to the pupil dilation server 120*b* and eye tracking server 120*c* in the first and second messages 1102*a*, 1102*b* respectively.

More generally, the processing can be distributed between the user device 106 and servers 120*b*, 120*c* in numerous different ways.

At least one secure execution environment is provided on the user device 106 in which code and data loaded inside the secure execution environment is integrity protected. To the extent that liveness detection processing is performed at the user device 104, it is performed within the secure execution environment.

The user device 106 applies a signature to both the first and second messages 1102*a*, 1102*b*. For each message 120*b*, 120*c*, the signature is generated by the user device based on both the PD and ET parameters sets.

The first and second messages 1102*a*, 1102*b* are transmitted to the URIs of the eye tracking server 120*b* and pupil dilation server 120*b*, as indicated in the instigation message 1101—not the other way round. That is the first message 1102*a*, containing the results of the randomized light pulse test, are transmitted to the eye tracking server 120*c*; likewise, the second message 1102*b*, containing the results of the randomized display element test, are transmitted to the pupil dilation server 120*b*. In other words, each message is transmitted to a server which is not its ultimate intended destination.

Note that the functionality of the serves 120*a*-120*c* need not be distributed across multiple computer devices (though that is not excluded). That is, their function may be implemented by a single device or by multiple devices, but within separate secure execution environments—for example by different processes in separate secure execution environments on the same device, or even different threads of the same program in separate secure execution environments. Regardless of how the functionality is implemented at the hardware level, a key aspect is that the three servers 120*a*-102*c* constitute three separate network endpoints of the network 118 i.e.:

- the endpoint from which the instigation message 1101 is transmitted to the user device 104;
- the endpoint to which the first message 1102*a* is transmitted, as indicated in the instigation message 1101 (which is a shared secret between the user device 104 and the remote system 130);
- the endpoint to which the second message 1102*b* is transmitted, as also indicated in the instigation message 1101 (and which is also a shared secret between the user device 104 and the remote system 130).

In the broadest sense, what is meant by having three separate servers 120*a*-120*c* within the remote system 130 is that the remote system 130 is configured to provide at least three separate network endpoints, e.g. as defined by three different URIs or other endpoint identifiers, and comprises associated logic for each network endpoint for effecting communications with the user device 106 via that endpoint. In other words, the servers 120*a*-120*c* are entities that are logically distinct form one another, each in the form a respective set of code executed in a separate, secure environment provided by the back-end system 130. They represent separate network endpoints in the sense that the three URIs are different from one another within the URI space (even if they ultimately response to the same IP address and even the same port number of the back-end system 130, which may or may not be the case).

The contents of the first message 1102*a* is communicated (S1110*a*) from the eye tracking 120*c* to the liveness server 120*a* along with the signature of the first message 1102*a* and the URI at which it was received.

Similarly, the contents of the second message 1102*b* is communicated (S1110*b*) from the pupil dilation server 120*b* to the liveness server 120*a* along with the signature of the second message 1102*b* and the URI at which it was received.

The liveness server 120*a* has access to both the PD and ET parameter sets by virtue of steps S1104*a* and S1104*b* respectively. It compares both sets with each of the signatures attached to the first and second messages 1102a, 1102b (recall each signature was generated by the user device 104 using both sets).

The liveness server also has access to the URIs that it supplied to the user device 102 in the first message 1101, and compares these with the URIs that the first and second messages 1102a, 1102b were actually sent to.

If either of the URIs actually used does not match the one that should have been used, or if either of the signatures does not match the parameter sets, this is communicated to the access controller 214, thereby causing the user 102 to be refused access to the remote system 130 e.g. to the database 132. For example, this can be achieved by automatically classifying the user as non-living to the access controller 214—even though the non-matching URI(s) and/or non-matching signature(s) are not directly indicative of this.

If both signatures and both URIs do match, the liveness server 120a provides (S1111a) the PD results (i.e. the contents of the first message 1102a, as provided by the eye tracking server 120c in step S110b) to the pupil dilation server 120b and provides (S1111b) the ET results (i.e. the contents of the second message 1102b, as provided by the pupil dilation server 102b in step S1110a) to the eye tracking server 120c.

The pupil dilation server 120b performs the liveness detection technique of the first embodiment for each eye separately, as described in detail above with reference to FIGS. 2A-2D, based on a comparison of the contents of the first message 1102a with the randomly generated PD parameter set so as to generate e.g. a probability that the user 102 is alive.

Figure 6C:
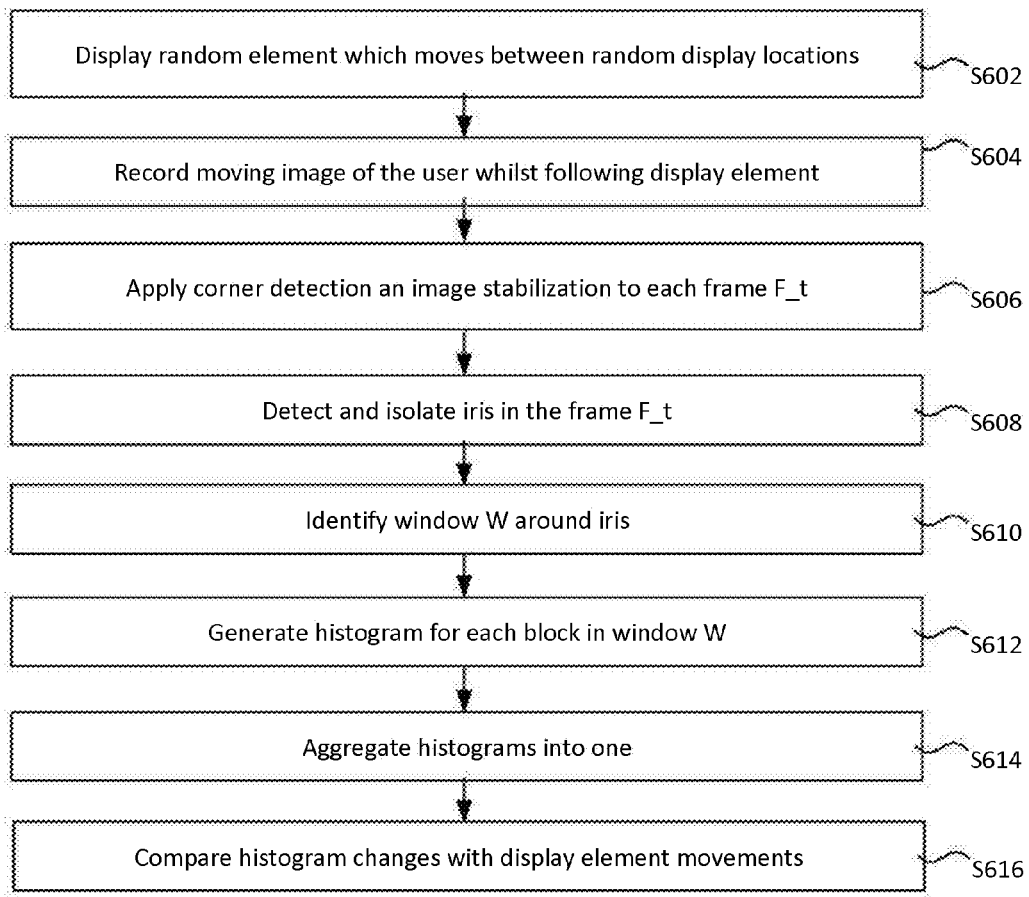
FIG. 6C shows a flow chart for a liveness detection method in the second embodiment.

Similarly, the eye tracking server 120c performs the liveness detection technique of the first process for each eye, as described in detail above with reference to FIGS. 6A-6C, based on a comparison of the contents of the second message 1102a with the randomly generated ET parameter set so as to generate e.g. a probability that the user is alive. Here, the second process detects when the movement exhibit by the eye is not consistent with the fact that the eye has recently been exposed to the medium-to-high intensity light pulse of the first embodiment (even if the movements themselves are consistent with the randomized locations in general terms). As will be apparent, this can be achieved by suitable tuning of the coefficients of the PDF used in the second process as part of normal design procedure. Where the movements are not consistent, this reduces the probability of the system that the user 102 is human (equivalently increases the probability that they are not).

The probabilities generated by the first and second processes are combined into an aggregate probability (e.g. by averaging, such as weighted averaging), which is communicated to the access controller 214 at step S112 or which is used to generate a binary classification of the user 102 as living/non-living, by comparing the aggregate probability with a threshold, that is communicated to the access controller 214 at step S112. The access controller 214 then decides whether or not to grant access to the remote system 130 e.g. to the database 132 based on this information.

The messages are "swapped" between the servers 120b, 120c (in steps S1110-S1111) via the same liveness server 120a within the confines of the back-end system 130, and the liveness server 120a only allows the swap to proceed (in step S111) if both signatures and both URIs are correct. This makes it much harder for a man-in-the-middle attack to take place.

Preferably, all communication between the user device 106 and servers 120a (liveness), 120b (pupil dilation), 120c (eye tracking) is via secure channels. This is particularly the case where the shared secrets are based in a method with well-known properties (pupil dilation/endpoints) as opposed to a "private" method. Where the particular properties are either unique or only known to a small number of actors (ellipse) this in itself can most likely provide sufficient security without the need for secure channels.

The secure channels (or non-secure channels as applicable) between the user device 104 and the different servers 120a-120c need not be via the same network (though they are in the above example).

An additional check can also be imposed by the system, which is that the time interval commencing with the transmission of the instigation message and ending with the receipt of the first and second message (whichever is received latest) is less than a predetermined time interval (e.g. 3 to 10 seconds long). If the time exceeds this, the user 102 is refused access regardless. An alternative timing window can be used, for example starting with the transmission of the initial message 1101 and ending with the liveness server 120a outputting the classification/aggregate confidence value at step S1112.

The liveness detection techniques presented herein can, for example, be used as part of an enrolment procedure for a digital identify system. For example, the Applicant's co-pending U.S. patent application Ser. Nos. 14/622,527, 14/622,709, 14/622,549, 14/622,737, 14/622,740—incorporated herein by reference—describe a digital identity system, in which a user can, for example, create a profile of their digital identity (referred to therein as a "uPass") based on an identity document, such as a passport, and a self-captured image of their face ("selfie"). The liveness detection process of the third embodiments can be incorporated into the uPass enrolment procedure when the user submits their selfie. In this case, the access controller 214 is implemented by the uPass enrolment module, and a user is only permitted to enroll and thereby create a uPass profile(s) if they are determined to be a living being with sufficient confidence.

As described above, in the third embodiment, in which two separate liveness tests are performed. In the above example, both tests are randomized i.e. performed according to separate respective sets of randomly generated parameter(s)—the randomized pulse test and the randomized display elements test. More generally, two separate liveness tests of different types can be used, one of which may not be randomized. For example, one of the tests may involve monitoring movements of a mobile device 104 as recorded using one or more sensors of the user device 104 (camera, gyroscope, other accelerometer, GPS etc.). For example, when a device that is known to be a mobile device, human-induced motion is expected at certain times (for instance, when certain actions are performed by the user device) and the absence of this can be used as an indication that the device is not being used by a living being. A living being has a number of distinct characteristics arising from their ongoing biological processes, the sum total of which constitutes life. The techniques presented above are based in particular on visual characteristics that are attributable to life, such as eye movement and pupil contraction. Other characteristics attributable to life include the ability to provide a thumb or finger print, which can also be used as a basis for a liveness detection test (note in this case what is being tested is not the identity attached to the finger print i.e. a match to a known finger print pattern is not being sought— it is simply the ability of a human to provide a humanoid finger or thumb print at a certain point in them that is being used as an indicator of life). By performing multiple, different liveness tests which are based on different ones of these life characteristics, as in the third embodiment, a greater range of life-like characteristics is tested thereby enabling deductions to be made with greater certainty.

Further, whilst in the above example, the two liveness tests are performed by a single user device 104, the two test could be performed by multiple, collocated devices available to the user—for instance, one test could be performed by a user's laptop and the other by their smartphone. Where signatures of the kind described above are used, both parameter sets are still sent to each device in this case, so that each device can generate the signature from both parameter sets.

Whilst the above has been described with reference to specific embodiments, these are exemplary and other variations may be apparent to the skilled person. The scope is not limited by the described embodiments but only by the following claims.

What is claimed is:

1. A computer-implemented liveness detection method comprising implementing, by a liveness detection system comprising a hardware processor, the following steps:
   selecting at random a first set of one or more parameters of a first liveness test;
   transmitting, to a user device available to an entity, the first parameter set, thereby causing the user device to perform the first liveness test according to the first parameter set;
   receiving from the user device results of the first liveness test performed at the user device according to the first parameter set;
   receiving results of a second liveness test pertaining to the entity;
   detecting whether a timeout condition has occurred, the timeout condition caused by an unacceptable delay in receiving the results relative to a timing of the transmitting step; and
   if the timeout condition occurs, refusing the entity access to a remote computer system in response to the timeout condition occurring, otherwise determining whether the entity is a living being using the results of the liveness tests, the results of the first liveness test being so used by comparing them with the first parameter set.

2. The method according to claim 1, further comprising implementing, by the liveness detection system, steps of:
   selecting at random a second set of one or more parameters of the second liveness test; and
   transmitting the second parameter set to the or another user device available to the entity, thereby causing that user device to perform the second liveness test according to the second parameter set, wherein the results of the second liveness test performed at that user device according to the second parameter set are received from that user device and used in the determining step by comparing them with the second parameter set.

3. The method according to claim 1, wherein the results of at least one of tests that are received at the liveness detection system have been generated by capturing a moving image of the entity.

4. The method according to claim 3, wherein the results of the at least one test as received at the liveness detection system comprise information that has been extracted from the moving image, wherein the extracted information is used in the determining step and describes at least one of:
   changes in the pupil size of at least one eye of the entity over time;
   changes in an iris pattern of at least one eye of the entity over time;
   eye movements exhibited by at least one eye of the entity; or
   lip movements exhibited by lips of the entity.

5. The method according to claim 3, wherein the results of that test that are received at the liveness detection comprise the moving image, the method further comprising processing, by the liveness detection system, the moving image to extract information from the moving image, wherein the extracted information is used in the determining step and describes least one of:
   changes in the pupil size of at least one eye of the entity over time;
   changes in an iris pattern of at least one eye of the entity over time;
   eye movements exhibited by at least one eye of the entity; or
   lip movement exhibited by lips of the entity.

6. The method according to claim 1, wherein one of the tests is performed by emitting at least one light pulse at a randomized timing that is defined by the parameter set of that test; and wherein the results of that test convey changes over time in the pupil size and/or in an iris pattern of at least one eye of the entity, and those results are compared with that parameter set to determine whether the changes in the pupil size and/or the iris pattern match the randomized timing.

7. The method according to claim 1, wherein one of the tests is performed by displaying at least one display element at a randomized display location that is defined by the parameter set of that test; and wherein the results of that test convey a response of the entity to the at least one display element as displayed in that test, and those results are compared with that parameter set to determine whether the response to the display element matches the at least one randomized display location.

8. The method according to claim 1, wherein one of the tests is performed by displaying a randomly selected display element that is defined by the parameter set of that test; and wherein the results of that test convey a response of the entity to the randomly selected display element, and those results are compared with that parameter set to determine whether the response of the entity matches the at least one randomly selected display element.

9. The method according to claim 1, wherein the second test is performed by the user device or another user device monitoring movements of that user device using at least one sensor of that user device.

10. The method according to claim 1, further comprising, by the liveness detection system:
    transmitting to the entity, from a source address of the liveness detection system, an identifier of at least one destination address of the liveness detection system different than the source address; and
    determining whether the results of at least one of the tests were transmitted to the at least one destination address.

11. The method according to claim 10, wherein the at least one destination address is randomly selected by the liveness detection system.

12. The method according to claim 10, wherein the at least one destination address is at least one URI.

13. The method according to claim 10, further comprising granting the entity access to a remote computer system only if it is determined that it is a living being and the results of the at least one of the test were been transmitted by to the at least one destination address.

14. The method according to claim 10, further comprising, by the liveness detection system:
transmitting to the entity, from the source address of the liveness detection system, a first and a second identifier of a first and a second destination address of the liveness detection system respectively, the first and second destination addresses being different from the source address and from each other;
determining whether the results of the second test were received at the first destination address; and
determining whether the results of the first test were received at the second destination address.

15. The method according to claim 14, wherein the liveness detection system comprises:
liveness control server logic;
first liveness processing server logic for processing the results of the first liveness test, the first liveness processing server logic having a plurality of addresses including the first destination address, and
second liveness processing logic for processing the results of the second liveness test, the second liveness processing logic having a plurality of addresses including the first destination address;
wherein the results of the second test are received at the first liveness processing server, and the results of the first liveness test are received at the second liveness processing server, and the method comprises:
the first liveness processing server providing the results of the second liveness test to the liveness control server;
the second liveness processing server providing the results of the first liveness test to the liveness control server; and
the liveness control server providing the results of the first test to the first liveness processing server and the results of the second test to the second liveness processing server only if: the results of the second test were received at the first destination address of the first liveness processing server, and the results of the first test were received at the second destination address of the second liveness processing server.

16. The method according to claim 15, further comprising implementing, by the liveness detection system, steps of:
selecting at random a second set of one or more parameters of the second liveness test; and
transmitting the second parameter set to the or another user device available to the entity, thereby causing that user device to perform the second liveness test according to the second parameter set, wherein the results of the second liveness test performed at that user device according to the second parameter set are received from that user device and used in the determining step by comparing them with the second parameter set,
wherein the results of the first and second tests are received in a first message and a second message respectively, each message comprising a signature expected to have been generated, for each message, from both parameter sets,
wherein the liveness control server compares both signatures with the first and second parameter sets and provides the results of the first test to the first liveness processing server and the results of the second test to the second liveness processing server only if: the second message was received at the first destination address of the first liveness processing server, the first message was received at the second destination address of the second liveness processing server, and both signatures match the parameter sets.

17. The method according to claim 1, further comprising granting the entity access to a remote computer system only if the entity is determined to be a living being.

18. The method according to claim 1, wherein the first and second tests are performed at the same time as one another.

19. The method according to claim 1, further comprising granting the entity access to a remote computer system only if the entity is determined to be a living being.

20. A liveness detection system comprising:
a set of one or more hardware processing units, the set configured to perform operations of:
selecting at random a first set of one or more parameters of a first liveness test;
transmitting, to a user device available to an entity, the first parameter set, thereby causing the user device to perform the first liveness test according to the first parameter set;
receiving from the user device results of the first liveness test performed at the user device according to the first parameter set;
receiving results of a second liveness test pertaining to the entity;
detecting whether a timeout condition has occurred, the timeout condition caused by an unacceptable delay in receiving the results relative to a timing of the transmitting operation; and
if the timeout condition occurs, refusing the entity access to a remote computer system in response to the timeout condition occurring, otherwise determining whether the entity is a living being using the results of the liveness tests, the results of the first liveness test being so used by comparing them with the first parameter set.

21. A computer-implemented liveness detection method implemented by a liveness detection system, wherein the liveness detection system comprises a hardware processor and computer storage storing a shared secret known only to the liveness detection system and one or more authorized user devices, the method comprising implementing by the liveness detection system the following steps:
selecting at random a set of one or more parameters of a liveness test which, when combined with the shared secret, define expected outputs that should be provided in the liveness test;
transmitting the parameter set to a user device, thereby causing the user device to perform the liveness test according to the parameter set, whereby the user device can only provide the expected outputs therein if it also has access to its own version of the shared secret;
receiving from the user device results of the liveness test performed at the user device according to the first parameter set;
detecting whether a timeout condition has occurred, the timeout condition caused by an unacceptable delay in receiving the results relative to a timing of the transmitting step; and
if the timeout condition occurs, refusing the entity access to a remote computer system in response to the timeout condition occurring, otherwise:
using the parameter set and the shared secret stored at the liveness detection system to determine the expected outputs; and
comparing the results of the liveness test with the determined expected outputs to determine whether a behaviour of an entity that was subject to the liveness test performed at the user device is an expected reaction to the expected outputs, thereby determining from the entity's behaviour both whether the entity is a living being and whether the user device is one of the one or more authorized user devices.

22. The method according to claim 21, wherein the shared secret defines a restricted subset of a set of available display locations, wherein the parameter set defines one or more available display locations selected at random from the restricted subset, and wherein the expected outputs are provided by displaying one or more display elements at the one or more randomly selected available display locations on a display of the user device.

23. The method according to claim 22, wherein the behaviour is eye movements exhibited by at least one eye of the entity during the displaying of the one or more display elements at the user device and conveyed by the received results, the expected reaction being an expected movement of the eye, whereby it is determined both whether the entity is a living being and whether the user device is one of the authorized user device(s) from the entity's eye movements.

24. The method according to claim 21, wherein the shared secret defines an elliptical curve.

25. A liveness detection system comprising:
  computer storage storing a shared secret known only to the liveness detection system and one or more authorized user devices; and
  a set of one or more hardware processing units, the set configured to perform operations of:
    selecting at random a set of one or more parameters of a liveness test which, when combined with the shared secret, define expected outputs that should be provided in the liveness test;
    transmitting the parameter set to a user device, thereby causing the user device to perform the liveness test according to the parameter set, whereby the user device can only provide the expected outputs therein if it also has access to its own version of the shared secret;
    receiving from the user device results of the liveness test performed at the user device according to the first parameter set;
    detecting whether a timeout condition has occurred, the timeout condition caused by an unacceptable delay in receiving the results relative to a timing of the transmitting step; and
    if the timeout condition occurs, refusing the entity access to a remote computer system in response to the timeout condition occurring, otherwise:
      using the parameter set and the shared secret stored at the liveness detection system to determine the expected outputs; and
      comparing the results of the liveness test with the determined expected outputs to determine whether a behaviour of an entity that was subject to the liveness test performed at the user device is an expected reaction to the expected outputs, thereby determining from the entity's behaviour both whether the entity is a living being and whether the user device is one of the authorized user device(s).

26. Non-transitory computer readable media comprising computer readable instructions which, when executed by a hardware processor, cause the hardware processor to implement a method comprising:
  selecting at random a first set of one or more parameters of a first liveness test;
  transmitting, to a user device available to an entity, the first parameter set, thereby causing the user device to perform the first liveness test according to the first parameter set;
  receiving from the user device results of the first liveness test performed at the user device according to the first parameter set;
  receiving results of a second liveness test pertaining to the entity;
  detecting whether a timeout condition has occurred, the timeout condition caused by an unacceptable delay in receiving the results relative to a timing of transmitting the first parameter set; and
  if the timeout condition occurs, refusing the entity access to a remote computer system in response to the timeout condition occurring, otherwise determining whether the entity is a living being using the results of the liveness tests, the results of the first liveness test being so used by comparing them with the first parameter set.

* * * * *